(12) United States Patent
Coffey et al.

(10) Patent No.: US 10,700,778 B2
(45) Date of Patent: *Jun. 30, 2020

(54) PLUGGABLE ACTIVE OPTICAL MODULE WITH MANAGED CONNECTIVITY SUPPORT AND SIMULATED MEMORY TABLE

(71) Applicant: CommScope Technologies LLC, Hickory, NC (US)

(72) Inventors: Joseph C. Coffey, Burnsville, MN (US); Paul John Pepe, Clemmons, NC (US); Joseph Polland, Eden Prairie, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,565

(22) Filed: Feb. 11, 2019

(65) Prior Publication Data

US 2019/0173577 A1     Jun. 6, 2019

Related U.S. Application Data

(60) Continuation of application No. 15/401,815, filed on Jan. 9, 2017, now Pat. No. 10,205,519, which is a (Continued)

(51) Int. Cl.
*H04B 10/40* (2013.01)
*H04B 10/079* (2013.01)
(Continued)

(52) U.S. Cl.
CPC ....... *H04B 10/0795* (2013.01); *G02B 6/3895* (2013.01); *G02B 6/4261* (2013.01);
(Continued)

(58) Field of Classification Search
CPC ...... H04B 10/40; H04B 10/801; H04B 10/50; H04B 10/0799; G02B 6/3895;
(Continued)

(56) References Cited

U.S. PATENT DOCUMENTS

| 4,797,556 A | 1/1989 | Marzari et al. |
| 4,800,265 A | 1/1989 | Marzari et al. |

(Continued)

FOREIGN PATENT DOCUMENTS

| CA | 2876925 A1 | 1/2014 |
| CN | 1811743 A | 8/2006 |

(Continued)

OTHER PUBLICATIONS

"Embedded Ethernet System Design Guide", Aug. 2008, Publisher: Silicon Laboratories.

(Continued)

*Primary Examiner* — Tanya T Motsinger
(74) *Attorney, Agent, or Firm* — Fogg & Powers LLC

(57) ABSTRACT

A pluggable active optical module includes: electrical connector to communicate electrical signals; optical adapter(s) to communicate optical signals over optical fiber(s); storage device interface configured to contact corresponding storage device interface on optical fiber(s); transmitter optical assembly to convert electrical signals received from electrical connector into optical signals for communication by optical adapter(s) over optical fiber(s); a receiver optical assembly to convert optical signals received from optical adapter(s) to electrical signals for communication by electrical connector; controller to control transmitter optical assembly and receiver optical assembly; programmable processor coupled to storage device interface and first contact(s) of electrical connector and that accesses physical layer management information from storage device in optical (Continued)

fiber(s) through storage device interface and provides physical layer management information to host device connected to electrical connector; and switch between second contact of electrical connector and ground that selectively connects second contact of electrical connector to ground.

23 Claims, 13 Drawing Sheets

Related U.S. Application Data division of application No. 14/494,256, filed on Sep. 23, 2014, now Pat. No. 9,544,058.

(60) Provisional application No. 61/881,706, filed on Sep. 24, 2013.

(51) Int. Cl.
*H04B 10/80* (2013.01)
*G02B 6/38* (2006.01)
*G02B 6/42* (2006.01)

(52) U.S. Cl.
CPC ......... *G02B 6/4284* (2013.01); *G02B 6/4292* (2013.01); *H04B 10/40* (2013.01); *H04B 10/801* (2013.01)

(58) Field of Classification Search
CPC .. G02B 6/3817; G02B 6/3825; G02B 6/4246; G02B 6/43; G02B 6/4261; H04Q 1/136; H04Q 11/0067; H04Q 2011/0079
See application file for complete search history.

(56) References Cited

U.S. PATENT DOCUMENTS

| | | |
|---|---|---|
| 5,052,940 A | 10/1991 | Bengal |
| 5,053,723 A * | 10/1991 | Schemmel ............. H03B 5/366 331/116 R |
| 5,161,988 A | 11/1992 | Krupka et al. |
| 5,195,902 A | 3/1993 | Bengal |
| 5,299,944 A | 4/1994 | Larabell et al. |
| 5,394,503 A | 2/1995 | Dietz, Jr. et al. |
| 5,418,334 A | 5/1995 | Williams |
| 5,420,512 A | 5/1995 | Spillane et al. |
| 5,448,675 A | 9/1995 | Leone et al. |
| 5,461,693 A | 10/1995 | Pimpinella |
| 5,463,706 A | 10/1995 | Dumont et al. |
| 5,473,715 A | 12/1995 | Schofield et al. |
| 5,483,467 A | 1/1996 | Krupka et al. |
| 5,487,666 A | 1/1996 | DiGiovanni |
| 5,541,586 A | 7/1996 | Wise |
| 5,550,755 A | 8/1996 | Martin et al. |
| 5,606,664 A | 2/1997 | Brown et al. |
| 5,649,001 A | 7/1997 | Thomas et al. |
| 5,764,043 A | 6/1998 | Czosnowski et al. |
| 5,832,071 A | 11/1998 | Voelker |
| 5,854,824 A | 12/1998 | Bengal et al. |
| 5,876,240 A | 3/1999 | Derstine et al. |
| 5,909,464 A | 6/1999 | Cohen et al. |
| 5,910,776 A | 6/1999 | Black |
| 6,002,331 A | 12/1999 | Laor |
| 6,222,908 B1 | 4/2001 | Bartolutti et al. |
| 6,223,219 B1 | 4/2001 | Uniacke et al. |
| 6,234,830 B1 | 5/2001 | Ensz et al. |
| 6,238,235 B1 | 5/2001 | Shavit et al. |
| 6,240,090 B1 | 5/2001 | Enhager |
| 6,285,293 B1 | 9/2001 | German et al. |
| 6,300,877 B1 | 10/2001 | Schannach et al. |
| 6,307,880 B1 | 10/2001 | Evans et al. |
| 6,330,307 B1 | 12/2001 | Bloch et al. |
| 6,350,148 B1 | 2/2002 | Bartolutti et al. |
| 6,359,859 B1 | 3/2002 | Brolin et al. |
| 6,368,155 B1 | 4/2002 | Bassler et al. |
| 6,424,710 B1 | 7/2002 | Bartolutti et al. |
| 6,442,032 B1 | 8/2002 | Linares et al. |
| 6,499,861 B1 | 12/2002 | German et al. |
| 6,516,345 B1 | 2/2003 | Kracht |
| 6,522,737 B1 | 2/2003 | Bartolutti et al. |
| 6,564,258 B1 | 5/2003 | Uniacke |
| 6,574,221 B1 | 6/2003 | Petersen |
| 6,574,586 B1 | 6/2003 | David et al. |
| 6,577,243 B1 | 6/2003 | Dannenmann et al. |
| 6,636,152 B2 | 10/2003 | Schannach et al. |
| 6,640,308 B1 * | 10/2003 | Keyghobad .......... G05B 19/042 370/254 |
| 6,684,179 B1 | 1/2004 | David |
| 6,725,177 B2 | 4/2004 | David et al. |
| 6,778,505 B1 | 8/2004 | Bullman et al. |
| 6,881,096 B2 | 4/2005 | Brown et al. |
| D510,068 S | 9/2005 | Haggay et al. |
| 6,961,675 B2 | 11/2005 | David |
| 6,968,994 B1 | 11/2005 | Ashwood Smith |
| 6,976,867 B2 | 12/2005 | Navarro et al. |
| 6,993,417 B2 | 1/2006 | Osann, Jr. |
| 7,038,135 B1 | 5/2006 | Chan et al. |
| 7,039,028 B2 | 5/2006 | Chen et al. |
| 7,042,562 B2 | 5/2006 | Kiani et al. |
| 7,057,105 B2 | 6/2006 | Gottardo et al. |
| 7,075,910 B2 | 7/2006 | Chen et al. |
| 7,077,710 B2 | 7/2006 | Haggay et al. |
| 7,081,808 B2 | 7/2006 | Colombo et al. |
| 7,123,810 B2 | 10/2006 | Parrish |
| 7,126,918 B2 | 10/2006 | Roberts |
| 7,136,936 B2 | 11/2006 | Chan et al. |
| 7,142,536 B1 | 11/2006 | Gossett et al. |
| 7,153,142 B2 | 12/2006 | Shifris et al. |
| 7,159,026 B2 | 1/2007 | Lau et al. |
| 7,160,143 B2 | 1/2007 | David et al. |
| 7,161,265 B2 | 1/2007 | Barthelemy |
| 7,193,422 B2 | 3/2007 | Velleca et al. |
| 7,210,858 B2 | 5/2007 | Sago et al. |
| 7,224,904 B1 | 5/2007 | Giaretta et al. |
| 7,226,217 B1 | 6/2007 | Benton et al. |
| 7,229,020 B2 | 6/2007 | Goodison et al. |
| 7,234,944 B2 | 6/2007 | Nordin et al. |
| 7,254,652 B2 | 8/2007 | Anderson et al. |
| 7,266,087 B2 | 9/2007 | Wahl |
| 7,268,990 B1 * | 9/2007 | Loeb ................. H03F 1/52 330/279 |
| 7,289,334 B2 | 10/2007 | Behrens et al. |
| 7,297,018 B2 | 11/2007 | Caveney et al. |
| 7,312,715 B2 | 12/2007 | Shalts et al. |
| D559,186 S | 1/2008 | Kelmer |
| 7,315,224 B2 | 1/2008 | Gurovich et al. |
| 7,317,735 B1 | 1/2008 | Ojard |
| 7,328,033 B2 | 2/2008 | Rappaport et al. |
| 7,336,680 B2 | 2/2008 | Sorenson et al. |
| D564,966 S | 3/2008 | Shifris |
| 7,352,289 B1 | 4/2008 | Harris |
| 7,377,819 B1 | 5/2008 | Cooper et al. |
| 7,382,765 B2 | 6/2008 | Kennedy et al. |
| 7,401,985 B2 | 7/2008 | Aronson et al. |
| D575,743 S | 8/2008 | Shifris et al. |
| 7,411,405 B2 | 8/2008 | Nordin |
| 7,433,363 B2 | 10/2008 | Rosen et al. |
| 7,440,647 B2 | 10/2008 | Hosking |
| 7,445,389 B2 | 11/2008 | Aronson |
| 7,453,864 B2 | 11/2008 | Kennedy et al. |
| 7,468,669 B1 | 12/2008 | Beck et al. |
| 7,479,032 B2 | 1/2009 | Hoath et al. |
| 7,483,419 B2 | 1/2009 | Bullman et al. |
| 7,499,616 B2 | 3/2009 | Aronson et al. |
| 7,517,243 B2 | 4/2009 | Caveney et al. |
| 7,540,667 B2 | 6/2009 | Murano |
| 7,551,456 B2 | 6/2009 | Behrens et al. |
| 7,564,795 B2 | 7/2009 | Stephenson et al. |
| 7,586,942 B2 | 9/2009 | Golasky et al. |
| 7,616,589 B2 | 11/2009 | Nagata et al. |
| 7,698,156 B2 | 4/2010 | Martucci et al. |
| 7,744,291 B2 | 6/2010 | Dybsetter et al. |
| 7,762,727 B2 | 7/2010 | Aronson |

(56) References Cited

U.S. PATENT DOCUMENTS

| | | | |
|---|---|---|---|
| 7,765,348 B2 | 7/2010 | Dybsetter | |
| 7,778,510 B2 | 8/2010 | Aronson et al. | |
| 7,785,930 B2 | 8/2010 | Johnson | |
| 7,787,774 B2 | 8/2010 | Nelson | |
| 7,808,399 B2 | 10/2010 | McVey | |
| 7,809,276 B2 | 10/2010 | Ekkizogloy et al. | |
| 7,809,283 B2 | 10/2010 | Hahin et al. | |
| 7,819,328 B2 | 10/2010 | Levinson | |
| 7,839,266 B2 | 11/2010 | Hoglund et al. | |
| 7,841,780 B2 | 11/2010 | Nelson et al. | |
| 7,860,399 B2 | 12/2010 | Hsieh | |
| 7,870,242 B2 | 1/2011 | Nguyen | |
| 7,901,144 B2 | 3/2011 | Deng | |
| 7,908,406 B2 | 3/2011 | Dybsetter | |
| 7,920,788 B2 | 4/2011 | Nelson et al. | |
| 7,933,518 B2 | 4/2011 | Li et al. | |
| 7,957,649 B2 | 6/2011 | Dybsetter et al. | |
| 7,957,650 B2 | 6/2011 | Pan et al. | |
| 7,970,283 B2 | 6/2011 | Giaretta et al. | |
| 7,978,800 B2 | 7/2011 | Douma et al. | |
| 8,031,992 B2 | 10/2011 | Schrödinger | |
| 8,037,173 B2 | 10/2011 | Tuckey et al. | |
| 8,037,371 B1 | 10/2011 | Bikulcius et al. | |
| 8,068,739 B2 | 11/2011 | Levinson | |
| 8,083,417 B2 | 12/2011 | Aronson et al. | |
| 8,107,822 B2 | 1/2012 | Noble | |
| 8,111,999 B2 | 2/2012 | Ekkizogloy et al. | |
| 8,135,282 B2 | 3/2012 | Hosking | |
| 8,155,528 B2 | 4/2012 | Nelson | |
| 8,165,297 B2 | 4/2012 | Hoffmann | |
| 8,200,097 B2* | 6/2012 | Cole | G02B 6/4284 398/117 |
| 8,225,024 B2 | 7/2012 | Dybsetter | |
| 8,229,301 B2 | 7/2012 | Hahin et al. | |
| 8,233,793 B2 | 7/2012 | Nelson et al. | |
| 8,250,246 B2 | 8/2012 | Brockmann et al. | |
| 8,267,600 B2 | 9/2012 | Dybsetter et al. | |
| 8,346,091 B2* | 1/2013 | Kummetz | H04B 10/25753 398/115 |
| 8,526,810 B2 | 9/2013 | Cole et al. | |
| 8,938,166 B2* | 1/2015 | Roullot | H04B 10/40 398/135 |
| 9,207,417 B2 | 12/2015 | Coffey et al. | |
| 9,544,058 B2 | 1/2017 | Coffey et al. | |
| 2001/0001270 A1 | 5/2001 | Williams Vigliaturo | |
| 2002/0138604 A1 | 9/2002 | Kopelovitz et al. | |
| 2002/0198024 A1* | 12/2002 | Sakurai | G06F 13/387 455/558 |
| 2003/0046339 A1 | 3/2003 | Ip | |
| 2003/0061393 A1 | 3/2003 | Steegmans et al. | |
| 2003/0194912 A1 | 10/2003 | Ferentz | |
| 2003/0197619 A1 | 10/2003 | Lawrence et al. | |
| 2003/0215243 A1* | 11/2003 | Booth | H04B 10/806 398/135 |
| 2003/0219033 A1 | 11/2003 | Silvester | |
| 2004/0008996 A1* | 1/2004 | Aronson | G02B 6/4246 398/202 |
| 2004/0024717 A1 | 2/2004 | Sneeringer | |
| 2004/0041903 A1 | 3/2004 | Drexler et al. | |
| 2004/0073597 A1 | 4/2004 | Caveney et al. | |
| 2004/0120657 A1 | 6/2004 | Sago et al. | |
| 2004/0240807 A1 | 12/2004 | Frohlich et al. | |
| 2005/0013152 A1 | 1/2005 | Lee et al. | |
| 2005/0031352 A1 | 2/2005 | Light et al. | |
| 2005/0164548 A1 | 7/2005 | Spears et al. | |
| 2005/0186819 A1 | 8/2005 | Velleca et al. | |
| 2005/0190768 A1 | 9/2005 | Cutler | |
| 2005/0231125 A1* | 10/2005 | Becattini | H05B 47/185 315/195 |
| 2005/0249477 A1 | 11/2005 | Parrish | |
| 2006/0047800 A1 | 3/2006 | Caveney et al. | |
| 2006/0059293 A1 | 3/2006 | Wurzburg et al. | |
| 2006/0069905 A1 | 3/2006 | Moriwaki et al. | |
| 2006/0147178 A1 | 7/2006 | Ekkizogloy et al. | |
| 2006/0160395 A1 | 7/2006 | Macauley et al. | |
| 2006/0160396 A1 | 7/2006 | Macauley et al. | |
| 2006/0179144 A1 | 8/2006 | Nagase | |
| 2006/0185887 A1 | 8/2006 | Neujahr | |
| 2006/0203715 A1 | 9/2006 | Hunter et al. | |
| 2006/0227759 A1 | 10/2006 | Bohm et al. | |
| 2006/0253561 A1 | 11/2006 | Holmeide et al. | |
| 2006/0268507 A1 | 11/2006 | Takahashi | |
| 2006/0268747 A1 | 11/2006 | van Haalen et al. | |
| 2006/0282527 A1 | 12/2006 | Chiou et al. | |
| 2007/0025306 A1 | 2/2007 | Cox et al. | |
| 2007/0058338 A1 | 3/2007 | Lee | |
| 2007/0116411 A1 | 5/2007 | Benton et al. | |
| 2007/0117444 A1 | 5/2007 | Caveney et al. | |
| 2007/0153823 A1 | 7/2007 | Wojtowicz | |
| 2007/0162954 A1 | 7/2007 | Pela | |
| 2007/0230425 A1 | 10/2007 | Zheng et al. | |
| 2007/0230452 A1 | 10/2007 | Hough et al. | |
| 2007/0237463 A1* | 10/2007 | Aronson | G02B 6/4292 385/89 |
| 2007/0237468 A1 | 10/2007 | Aronson et al. | |
| 2007/0237471 A1* | 10/2007 | Aronson | G02B 6/4292 385/101 |
| 2007/0237472 A1* | 10/2007 | Aronson | G02B 6/4292 385/101 |
| 2007/0274234 A1 | 11/2007 | Kubota | |
| 2008/0159738 A1 | 7/2008 | Lavranchuk | |
| 2008/0181136 A1 | 7/2008 | Watanabe et al. | |
| 2008/0181138 A1 | 7/2008 | Dalberg | |
| 2008/0219268 A1 | 9/2008 | Dennison | |
| 2008/0265915 A1 | 10/2008 | Clark et al. | |
| 2008/0267620 A1* | 10/2008 | Cole | H04B 10/0775 398/17 |
| 2009/0074404 A1 | 3/2009 | Suryaputra et al. | |
| 2009/0195349 A1 | 8/2009 | Frader-Thompson et al. | |
| 2010/0020722 A1 | 1/2010 | Farkas et al. | |
| 2010/0040371 A1 | 2/2010 | Wu et al. | |
| 2010/0054157 A1 | 3/2010 | Farkas et al. | |
| 2010/0171562 A1* | 7/2010 | Lim | H04B 13/005 332/117 |
| 2010/0215049 A1 | 8/2010 | Raza et al. | |
| 2010/0215362 A1 | 8/2010 | Shimoosako et al. | |
| 2010/0238003 A1 | 9/2010 | Chan et al. | |
| 2011/0167269 A1 | 7/2011 | Baykal et al. | |
| 2011/0221601 A1* | 9/2011 | Aguren | G02B 6/3895 340/653 |
| 2012/0019366 A1 | 1/2012 | Aguren | |
| 2012/0019962 A1* | 1/2012 | Faxvog | H02H 7/0455 361/1 |
| 2012/0033979 A1 | 2/2012 | Priyadarshi | |
| 2012/0063501 A1 | 3/2012 | Aguren | |
| 2013/0086211 A1 | 4/2013 | Sondhi et al. | |
| 2013/0129346 A1* | 5/2013 | Zbinden | H04B 10/2503 398/25 |
| 2013/0148976 A1 | 6/2013 | Patel et al. | |
| 2013/0343764 A1* | 12/2013 | Coffey | G02B 6/43 398/135 |
| 2014/0016527 A1 | 1/2014 | Coffey | |
| 2014/0019662 A1 | 1/2014 | Coffey | |
| 2014/0023326 A1 | 1/2014 | Anderson et al. | |
| 2014/0038462 A1* | 2/2014 | Coffey | G02B 6/3807 439/620.15 |
| 2015/0086211 A1* | 3/2015 | Coffey | H04B 10/40 398/116 |
| 2015/0153520 A1 | 6/2015 | Lin | |
| 2016/0088374 A1 | 3/2016 | Coffey et al. | |
| 2017/0117959 A1 | 4/2017 | Coffey et al. | |

FOREIGN PATENT DOCUMENTS

| | | |
|---|---|---|
| CN | 101199161 A | 6/2008 |
| CN | 102165735 A | 8/2011 |
| CN | 102396191 A | 3/2012 |
| CN | 102884460 A | 1/2013 |
| CN | 104395799 A | 3/2015 |
| CN | 106662713 A | 5/2017 |
| CN | 104395799 B | 8/2018 |
| CN | 106662713 B | 10/2018 |

(56) References Cited

FOREIGN PATENT DOCUMENTS

| | | |
|---|---|---|
| EP | 1569494 A2 | 8/2005 |
| EP | 2098095 A1 | 9/2009 |
| JP | 2001297044 A | 10/2001 |
| JP | 2003207686 A | 7/2003 |
| JP | 2009130685 A | 6/2009 |
| JP | 2012501577 A | 1/2012 |
| JP | 2015520379 A | 7/2015 |
| JP | 2015531103 A | 10/2015 |
| KR | 1020080017170 A | 2/2008 |
| KR | 101020053 B1 | 3/2011 |
| KR | 101693606 B1 | 1/2017 |
| WO | 2008076235 A1 | 6/2008 |
| WO | 2010024848 A1 | 3/2010 |
| WO | 2010121639 A1 | 10/2010 |
| WO | 2011087509 A1 | 7/2011 |
| WO | 2014004421 A1 | 1/2014 |

OTHER PUBLICATIONS

"INF-8074i Specification for SFP (Small Formfactor Pluggable) Transceiver Rev 1.0", May 12, 2001, pp. 1-38, Publisher: SFF Committee.

U.S. Patent and Trademark Office, "Final Office Action", U.S. Appl. No. 12/705,514, dated Aug. 23, 2012, pp. 1-20, Published: US.

"IntelliMAC", May 2003, pp. 1-6, Publisher: Nordx/CDT.

"The EtherSmart Wildcard", "http://www.mosaic-industries.com/Products/WildCards/ETHx/", at least as early as Dec. 2008, Publisher: Mosaic Industries, Inc.

"UPnP Device Architecture 1.1", Oct. 15, 2008, pp. 1-272, Publisher: UPnP Forum.

Australian Government IP Australia, "Notice of Acceptance from AU Application No. 2013280604 dated Jan. 17, 2017", from Foreign Counterpart to U.S. Appl. No. 13/926,378, pp. 1-3, Published: AU.

Australian Government IP Australia, "Patent Examination Report No. 1 from AU Application No. 2013280604 dated Jan. 15, 2016", from Foreign Counterpart to U.S. Appl. No. 13/926,378, pp. 1-2, Published: AU.

Canadian Intellectual Property Office, "Notice of Allowance from CA Application No. 2,876,925 dated Jul. 28, 2016", from Foreign Counterpart to U.S. Appl. No. 13/926,378, p. 1 Published: CA.

Canadian Intellectual Property Office, "Office Action from CA Application No. 2,876,925 dated Dec. 17, 2015", from Foreign Counterpart to U.S. Appl. No. 13/926,378, pp. 1-5, Published: CA.

Chile Patent Office, "Office Action for CL Application No. 3441-14 dated Mar. 30, 2016", from Foreign Counterpart to U.S. Appl. No. 13/926,378, pp. 1-11, Published: CL.

Dimitrov et al., "Embedded Internet Based System", at least as early as Dec. 2008, pp. 103-107

European Patent Office, "Communication pursuant to Article 94(3) from EP Application No. 13810693.5 dated May 30, 2017", from Foreign Counterpart to U.S. Appl. No. 13/926,378, pp. 1-5, Published: EP.

European Patent Office, "Extended European Search Report from EP Application No. 10741842.8 dated Sep. 27, 2012", from Foreign Counterpart to U.S. Appl. No. 12/705,497, pp. 1-6, Published: EP.

European Patent Office, "Extended European Search Report from EP Application No. 10741843.6 dated Sep. 19, 2012", from Foreign Counterpart to U.S. Appl. No. 12/705,501, pp. 1-9, Published: EP.

European Patent Office, "Extended European Search Report from EP Application No. 10741844.4 dated Oct. 11, 2012", from Foreign Counterpart to U.S. Appl. No. 12/705,506, pp. 1-9, Published: EP.

European Patent Office, "Extended European Search Report from EP Application No. 10741845.1 dated Oct. 11, 2012", from Foreign Counterpart to U.S. Appl. No. 12/705,514, pp. 1-6, Published: EP.

European Patent Office, "Extended European Search Report from EP Application No. 11007151.1 dated May 22, 2012", from Foreign Counterpart to U.S. Appl. No. 12/705,501, pp. 1-7, Published: EP.

European Patent Office, "Extended European Search Report from EP Application No. 13810693.5 dated Jul. 22, 2016", from Foreign Counterpart to U.S. Appl. No. 13/926,378, pp. 1-11, Published: EP.

European Patent Office, "Extended European Search Report from EP Application No. 14846846.5 dated Jun. 27, 2017", from Foreign Counterpart to U.S. Appl. No. 14/494,256, pp. 1-7, Published: EP.

Farkas et al., "Automatic Discovery of Physical Topology in Ethernet Networks", "Advance Information Networking and Applications, 2008. AINA 2008. 22nd International Conference on", Mar. 25-28, 2008, pp. 848-854, Publisher: IEEE, Published in: Okinawa.

Feuzeu et al., "A New Scheme for Interconnecting LANS With Label Switching Bridges", "Local Computer Networks, 2005. 30th Anniversary. The IEEE Conference on", Nov. 17, 2005, pp. 303-311, Publisher: IEEE, Published in: Sydney.

Figueira et al., "10GE WAN PHY: Physical Medium Attachment (PMA)", "IEEE 802.3 Meeting, Albuquerque", Mar. 2000, pp. 1-42.

International Bureau, "International Preliminary Report on Patentability from PCT Application No. PCT/US2013/047462 dated Jan. 8, 2015", from Foreign Counterpart to U.S. Appl. No. 13/926,378, pp. 1-8, Published: WO.

International Searching Authority, "International Search Report and Written Opinion from PCT Application No. PCT/US2010/024186 dated Sep. 30, 2010", from Foreign Counterpart to U.S. Appl. No. 12/705,506, pp. 1-9, Published: WO.

International Searching Authority, "International Search Report and Written Opinion from PCT Application No. PCT/US2012/068395 dated Mar. 21, 2013", from Foreign Counterpart to U.S. Appl. No. 13/707,908, pp. 1-9, Published: WO.

International Searching Authority, "International Search Report and Written Opinion from PCT Application No. PCT/US2013/047462 dated Sep. 27, 2013", from Foreign Counterpart to U.S. Appl. No. 13/926,378, pp. 1-11, Published: WO.

International Searching Authority, "International Search Report and Written Opinion from PCT Application No. PCT/US2014/056938 dated Jan. 9, 2015", from Foreign Counterpart to U.S. Appl. No. 14/494,256, pp. 1-16, Published: WO.

Japanese Patent Office, "Notice of Reasons for Rejection from JP Application No. 2015520379 dated Apr. 18, 2016", from Foreign Counterpart to U.S. Appl. No. 13/926,378, pp. 1-21, Published: JP.

Japanese Patent Office, "Office Action from JP Application No. 2015520379 dated Dec. 22, 2016", from Foreign Counterpart to U.S. Appl. No. 13/926,378, pp. 1-12, Published: JP.

Kang et al., "Design and Implementation of Network Management System for Power Line Communication Network", "IEEE International Symposium on Power Line Communications and its Applications (ISPLC 2007)", Mar. 28, 2007, pp. 23-28, Publisher: IEEE.

Korean Intellectual Property Office, "Decision to Grant from KR Application No. 10-2014-7035579 dated Oct. 4, 2016", from Foreign Counterpart to U.S. Appl. No. 13/926,378, pp. 1-6, Published: KR.

Korean Intellectual Property Office, "Office Action from KR Application No. 10-2014-7035579 dated May 16, 2016", from Foreign Counterpart to U.S. Appl. No. 13/926,378, pp. 1-13, Published: KR.

Meredith, "Managers Missing Point of Intelligent Patching", "http://searchdatacenter.techtarget.com/news/article/0,289142,sid80_gci1099991,00.html", Jun. 21, 2005, pp. 1-2, Publisher: SearchDataCenter.com.

Mexican Patent Office, "Notice of Allowance for MX/a/2014/015522", "from Foreign Counterpart to U.S. Appl. No. 13/926,378", dated Apr. 7, 2016, pp. 1-2, Published in: MX.

Mexican Patent Office, "Office Action for MX Application No. MX/a/2014/015522", "from Foreign Counterpart to U.S. Appl. No. 13/926,378", dated Jan. 11, 2016, pp. 1-3, Published in: MX.

Milligan, "Intelligent Patching Systems Carving Out a 'Large' Niche", "http://www.cablinginstall.com/index/display/article-display/207641/articles/cabling-installation-maintenance/volume-12/issue-7/contents/technology/int", Jul. 1, 2004, pp. 1-6, vol. 12, No. 7, Publisher: Cabling Installation & Maintenance.

Mirjalily et al., "Best Multiple Spanning Tree in Metro Ethernet Networks", "Computer and Electrical Engineering, 2009. ICEE'09. Second International Conference on", Dec. 28-30, 2009, pp. 117-121, vol. 2, Publisher: IEEE, Published in: Dubai.

(56) References Cited

OTHER PUBLICATIONS

New Zealand Intellectual Property Office, "First Examination Report from NZ Application No. 702985 dated Mar. 28, 2017", from Foreign Counterpart to U.S. Appl. No. 13/926,378, pp. 1-5, Published: NZ.

State Intellectual Property Office, P.R. China, "First Office Action from CN Application No. 201080016472.6 dated Sep. 4, 2012", from Foreign Counterpart to U.S. Appl. No. 12/705,514, pp. 1-14, Published: CN.

State Intellectual Property Office, P.R. China, "First Office Action from CN Application No. 201080016490.4 dated Sep. 5, 2012", from Foreign Counterpart to U.S. Appl. No. 12/705,501, pp. 1-24, Published: US.

State Intellectual Property Office, P.R. China, "First Office Action from CN Application No. 201380033678.3 dated May 4, 2017", from Foreign Counterpart to U.S. Appl. No. 13/926,378, pp. 1-27, Published: CN.

State Intellectual Property Office, P.R. China, "First Office Action from CN Application No. 201480062924.2 dated Dec. 27, 2017", from Foreign Counterpart to U.S. Appl. No. 14/494,256, pp. 1-9, Published: CN.

State Intellectual Property Office, P.R. China, "Second Office Action from CN Application No. 201380033678.3 dated Jan. 22, 2018", from Foreign Counterpart to U.S. Appl. No. 13/926,378, pp. 1-15, Published: CN.

U.S. Patent and Trademark Office, "Advisory Action", U.S. Appl. No. 12/705,514, dated Nov. 14, 2012, pp. 1-4, Published: US.

U.S. Patent and Trademark Office, "Corrected Notice of Allowability", U.S. Appl. No. 14/494,256, dated Nov. 3, 2016, pp. 1-5, Published: US.

U.S. Patent and Trademark Office, "Corrected Notice of Allowability", U.S. Appl. No. 14/494,256, dated Dec. 9, 2016, pp. 1-9, Published: US.

U.S. Patent and Trademark Office, "Corrected Notice of Allowability", U.S. Appl. No. 15/401,815, dated Oct. 29, 2018, pp. 1-44, Published: US.

U.S. Patent and Trademark Office, "Final Office Action", U.S. Appl. No. 12/705,497, dated Oct. 16, 2012, pp. 1-29, Published: US.

U.S. Patent Trademark Office, "Notice of Allowance", U.S. Appl. No. 13/926,378, dated Aug. 3, 2015, pp. 1-10, Published: US.

U.S. Patent and Trademark Office, "Notice of Allowance", U.S. Appl. No. 14/494,256, dated Aug. 26, 2016, pp. 1-14, Published: US.

U.S. Patent and Trademark Office, "Notice of Allowance", U.S. Appl. No. 14/957,288, dated Oct. 24, 2016, pp. 1-26, Published: US.

U.S. Patent and Trademark Office, "Notice of Allowance", U.S. Appl. No. 15/401,815, dated Sep. 27, 2018, pp. 1-21, Published: US.

U.S. Patent and Trademark Office, "Office Action", U.S. Appl. No. 12/705,497, dated Apr. 17, 2012, pp. 1-31, Published: US.

U.S. Patent and Trademark Office, "Office Action", U.S. Appl. No. 12/705,506, dated Jun. 28, 2012, pp. 1-32, Published: US.

U.S. Patent and Trademark Office, "Office Action", U.S. Appl. No. 12/705,514, dated Mar. 15, 2012, pp. 1-25, Published: US.

U.S. Patent and Trademark Office, "Office Action", U.S. Appl. No. 13/926,378, dated Apr. 15, 2015, pp. 1-56, Published: US.

U.S. Patent and Trademark Office, "Office Action", U.S. Appl. No. 14/494,256, dated Apr. 18, 2016, pp. 1-60, Published: US.

U.S. Patent and Trademark Office, "Office Action", U.S. Appl. No. 14/957,288, datd May 12, 2016, pp. 1-57, Published: US.

U.S. Patent and Trademark Office, "Office Action", U.S. Appl. No. 15/401,815, dated Apr. 19, 2018, pp. 1-63, Published: US.

U.S. Patent and Trademark Office, "Restriction Requirement", U.S. Appl. No. 14/494,256, dated Dec. 1, 2015, pp. 1-4, Published: US.

\* cited by examiner

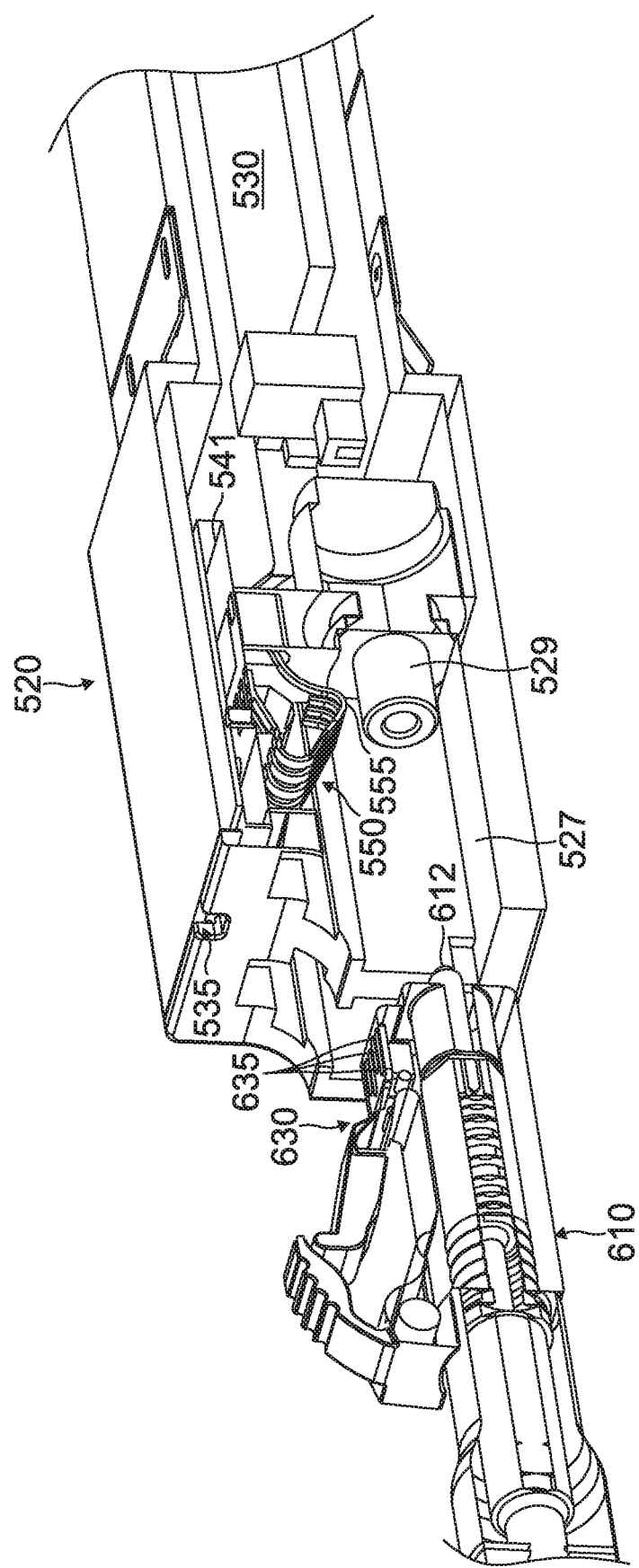

PLUGGABLE ACTIVE OPTICAL MODULE WITH MANAGED CONNECTIVITY SUPPORT AND SIMULATED MEMORY TABLE

CROSS-REFERENCE TO RELATED APPLICATIONS

This application is a continuation of U.S. patent application Ser. No. 15/401,815 filed Jan. 9, 2017 and entitled "PLUGGABLE ACTIVE OPTICAL MODULE WITH MANAGED CONNECTIVITY SUPPORT AND SIMULATED MEMORY TABLE", which is a divisional of U.S. patent application Ser. No. 14/494,256 filed Sep. 23, 2014 and entitled "PLUGGABLE ACTIVE OPTICAL MODULE WITH MANAGED CONNECTIVITY SUPPORT AND SIMULATED MEMORY TABLE", which claims the benefit of U.S. Provisional Patent Application Ser. No. 61/881,706, filed on Sep. 24, 2013, which is hereby incorporated herein by reference.

BACKGROUND

Data centers utilize high speed optical fiber connectivity to interconnect ports from network elements such as servers, switches, and routers to other network elements. These network elements can be configured for use with a pluggable active optical module that converts a high speed serial electrical signal at a port of the network element to and from an optical signal. Such a pluggable active optical module can be integrated into a connector of a fiber optic cable or can be separate from any cable, which is commonly referred to as a pluggable active optical module (AOM). A pluggable AOM has an electrical connector on one side, for connection with a port of the network element (also referred to herein as a "host device"), and one or more optical adapters on the other side for connection with a fiber optic cable. One example of a pluggable AOM is a small form-factor pluggable (SFP) module.

The mechanical and electrical interface between the network element and a pluggable active optical module is defined by a set of multi-source agreement (MSA) documents. These documents are based on functional requirements defined in IEEE standard 802.3 for Ethernet and T11 (X3T9.3) for Fiber Channel. The MSA defines one pin of the electrical interface as a "module present pin". The module present pin is used by the network element to detect when a pluggable AOM is present in the respective port.

SUMMARY

An embodiment described herein relates to a pluggable active optical module (AOM) having an electrical connector at a first end for communicating electrical signals, and one or more optical adapters at a second end for communicating optical signals to/from one or more optical fibers. The AOM includes a storage device interface at the second end, wherein the storage device interface is configured to contact a corresponding storage device interface on the one or more optical fibers. The AOM also includes a transmitter optical assembly (TOSA) for converting electrical signals from the electrical connector into optical signals for transmission over the one or more optical fibers, and a receiver optical assembly (ROSA) for converting optical signals from the one or more optical fibers to electrical signals for sending from the electrical connector. The AOM also includes a controller for controlling the TOSA and ROSA, and a programmable processor coupled to the storage device interface and one or more first contacts of the electrical connector. The programmable processor is configured to access a storage device in the one or more optical fibers through the storage device interface and provide physical layer management (PLM) information obtained therefrom to a host device connected to the electrical connector. The AOM also includes a switch coupled between a second contact of the electrical connector and ground, the switch coupled to the programmable processor such that that programmable processor can control the switch to selectively connect a second contact of the electrical connector to ground.

DRAWINGS

Understanding that the drawings depict only examples and are not therefore to be considered limiting in scope, the examples will be described with additional specificity and detail through the use of the accompanying drawings, in which:

FIG. 9 is a cut-away view of an example active optical module and a physical communication media.

In accordance with common practice, the various described features are not drawn to scale but are drawn to emphasize specific features relevant to the examples. Like reference numbers and designations in the various drawings indicate like elements.

DETAILED DESCRIPTION

Figure 1:
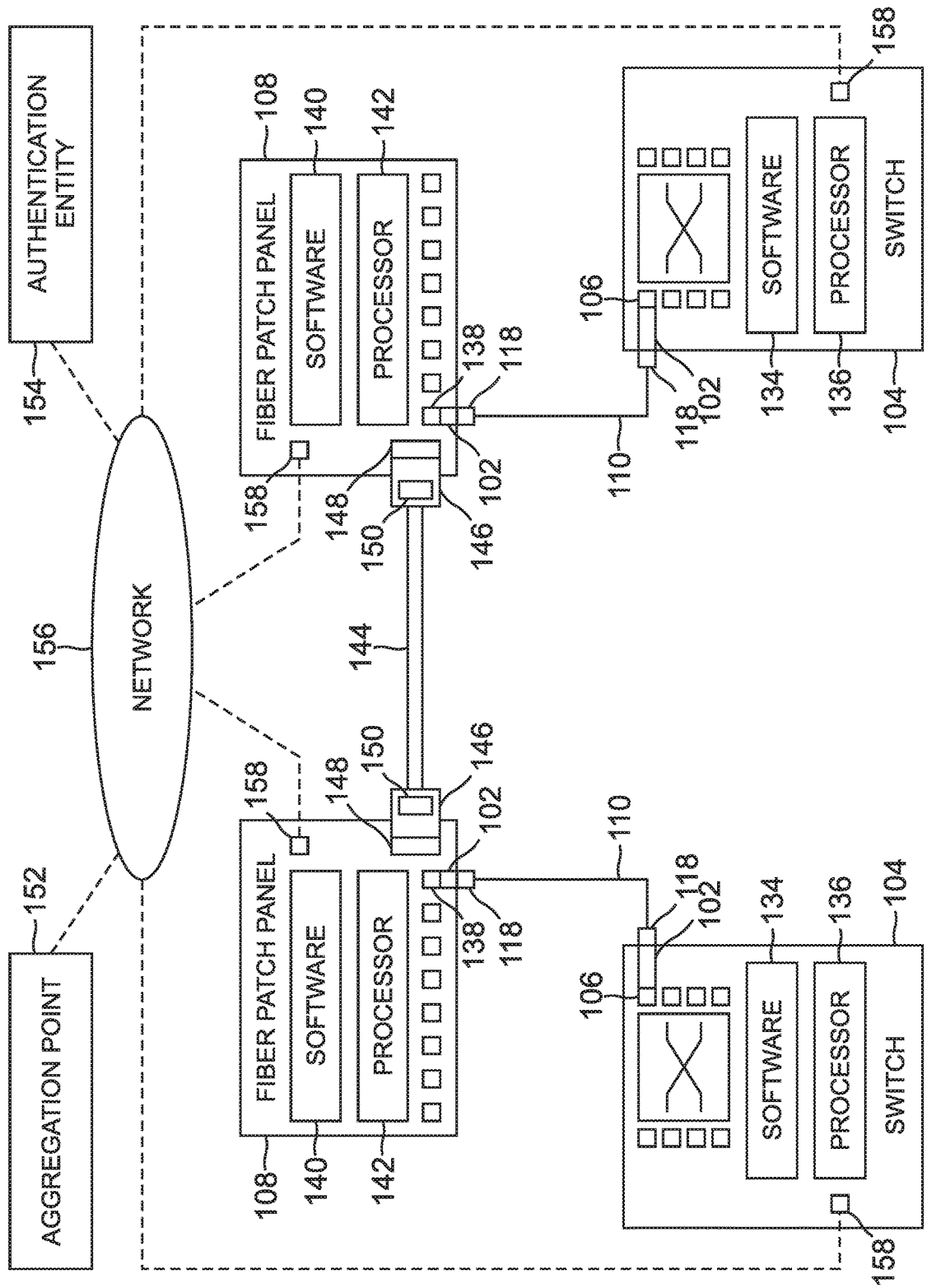
FIG. 1 is a block diagram of one example of a system including physical communication media (PCM) and pluggable active optical modules (AOMs) connected between the physical communication media and respective host devices.

FIG. 1 is a block diagram of one example of a system 100 including physical communication media (PCM) 110 and pluggable active optical modules (AOMs) 102 connected between the physical communication media 110 and respective host devices 104. In this example, the physical communication media 110 is a duplex fiber optic cable including one or more optical fibers. The one or more optical fibers can include single-mode or multi-mode fibers. The fiber optic cable can include a simplex cable, duplex cable, 12-fiber cable, 24-fiber cable and other fiber optic cables (such as hybrid fiber/copper cables).

The system 100 is described here as including two host devices 104 that are implemented as Gigabit ETHERNET switches 104 (though the system 100 can include one, or more than two, switches 104 and/or different types of host devices 104). Consequently, the two host devices 104 shown in FIG. 1 are also referred to here as "switches" 104. Examples of other types of host devices 104 that can be used include, without limitation, routers, gateways, access points, server computers, end-user computers, appliance computers (such as network-attached storage (NAS) devices), and nodes of a storage area network (SAN). Also, in the example shown in FIG. 1, the system 100 includes two passive optical interconnects 108 that are implemented as two fiber patch panels 108 (though the system 100 can include a different number of fiber patch panels 108 (including a system without patch panels 108) and/or different types of passive optical interconnects 108). Consequently, the two passive optical interconnects 108 shown in FIG. 1 are also referred to here as "fiber patch panels" 108. Examples of other types of passive optical interconnects 108 that can be used include, without limitation, other types of optical patch panels, fiber distribution hubs (FDH), fiber splice panels, fiber trays, and fiber termination points. Examples of active optical modules 102 and physical communication media 110 include, without limitation, GIGABIT ETHERNET, FIBRE CHANNEL, INFINIBAND, Serial Attached SCSI (SAS), and SONET/SDH.

Many types of host devices 104 and passive optical interconnects 108 include multiple ports, though the techniques described here are not limited to host devices 104 or passive optical interconnects 108 that include multiple ports.

Figure 2:
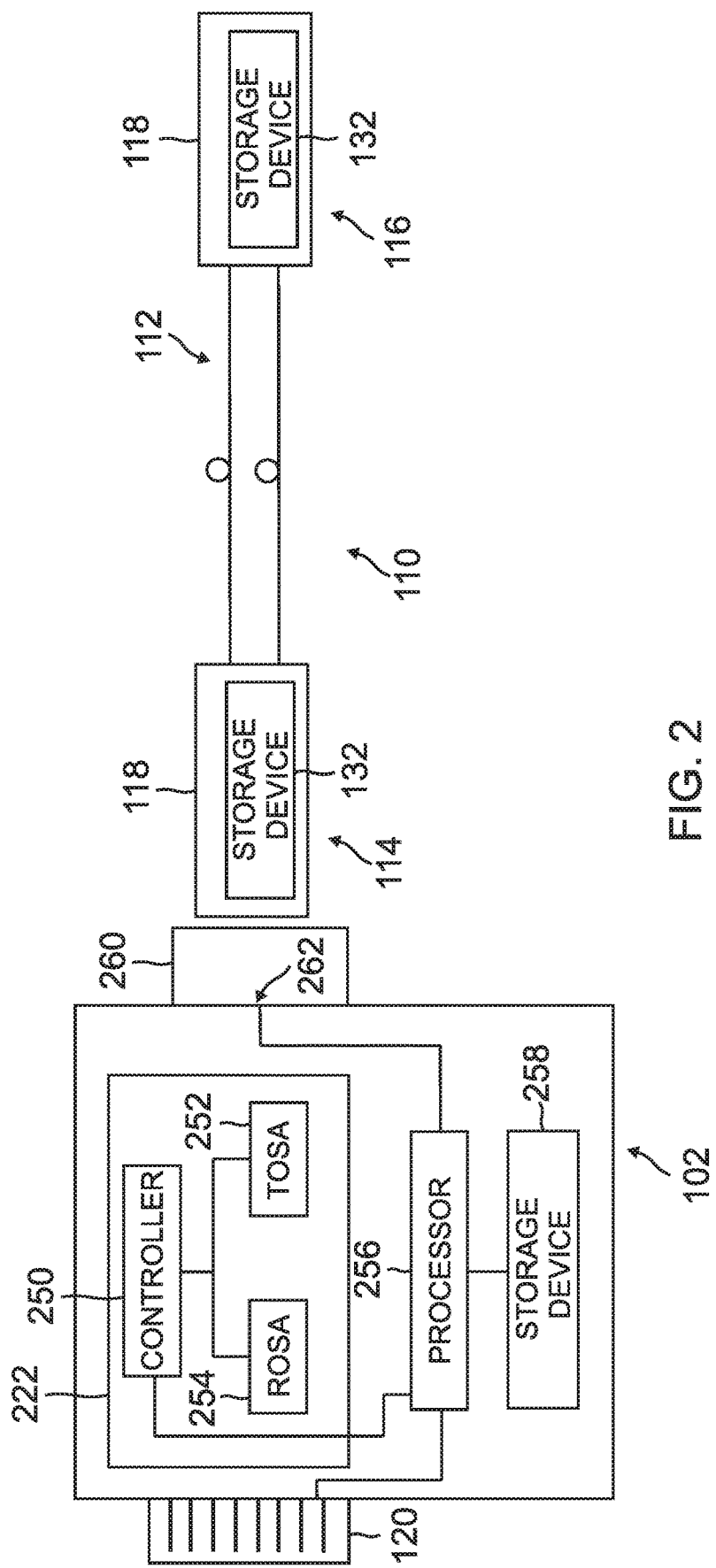
FIG. 2 is a block diagram of an example active optical module and a physical communication media suitable for use in the system shown in FIG. 1.

In the example shown in FIG. 1, a first active optical module 102 is connected to a (first) port 106 of a first one of the two switches 104. A second active optical module 102 is connected to a (second) port 106 of a second one of the two switches 104. In the example shown in FIG. 1, each of the ports 106 of the switches 104 are configured to include an inventory interface (shown in FIGS. 2-4). The inventory interface in the ports 106 is configured to mate and inter-operate with a complimentary inventory interface in each of the active optical modules 102. Software 134 executing on a programmable processor 136 associated with each switch 104 is able to read and write data to and from a storage device 258 (e.g., a storage device 258 within a microprocessor 256 as shown in FIG. 2) included in each active optical module 102 that is connected to a given port 106 using that port's inventory interface. The software 134 and programmable processor 136 are implemented in a conventional manner except as described here.

A passive optical connector 118 at a first end 114 (shown in FIG. 2) of respective physical communication media 110 is connected to the first and second active optical modules 102. The active optical module 102 is configured to perform the electrical-to-optical (E/O) and optical-to-electrical (O/E) conversions for signals to be sent and received over the respective PCM 110 to and from a respective switch 104.

In the example shown in FIG. 1, a passive optical connector 118 at a second end 116 (shown in FIG. 2) of the PCM 110 is connected to a duplex port 138 of one of the two fiber patch panels 108. This fiber patch panel 108 is also referred to here as the "first" patch panel 108, and the port 138 to which the first physical communication media 110 is connected is also referred to here as the "first patch-panel port" 138. The passive optical connector 118 at the passive end 116 of the second physical communication media 110 is connected to a duplex port 138 of the second of the two fiber patch panels 108. This fiber patch panel 108 is also referred to here as the "second" patch panel 108, and the port 138 to which the second active optical cable segment 110 is connected is also referred to here as the "second patch-panel port" 138.

In the example shown in FIG. 1, each of the patch-panel ports 138 of the fiber patch panels 108 is configured to include a storage-device interface (not separately shown). The storage-device interface in each port 138 is configured to mate and inter-operate with a storage-device interface used in the passive optical connector 118 of the second end 116 of the respective PCM 110. Software 140 executing on a programmable processor (such as a controller) 142 associated with the fiber patch panel 108 is able to read and write data from and to a storage device 132 associated with any passive optical connector 118 that is connected to a given port 138 using that port's storage-device interface. The software 140 and programmable processor 142 can be implemented in the manner described in the US provisional patent applications and US non-provisional patent applications cited herein. One example of such a storage device and interface are the storage devices and interfaces used in the QUAREO™ family of physical layer management products that are commercially available from TE Connectivity.

In the example shown in FIG. 1, each patch panel port 138 in the first fiber patch panel 108 is communicatively coupled to a respective patch-panel port 138 in the second fiber patch panel 108 via an optical trunk cable 144. The optical trunk cable 144 is a multiple-fiber cable, where each duplex port 138 of each of the fiber patch panels 108 is connected to a respective pair of fibers in the trunk cable 144. The trunk cable 144 includes a multi-fiber connector 146 (for example, a suitable MPO or MTP connector) at each end of the cable 144. Each fiber patch panel 108 includes a trunk connector 148 (for example, a suitable MPO or MTP connector) designed to be connected to the multi-fiber connector 146 attached to the trunk cable 144.

In this example, each multi-fiber connector 146 attached to the optical trunk cable 144 also includes or is otherwise associated with a respective storage device 150, and the connectors 146 and 148 include or are otherwise associated with a respective storage-device interface (not shown) by which the software 140 running on each fiber patch panel 108 can read and write data to the storage device 150. The storage devices 150 that are included in or otherwise associated with the multi-fiber connectors 146 attached to the trunk cable 144 are also referred to here as the "trunk-cable" storage devices 150. The storage-device interface can be implemented as described in the manner described in the US provisional patent applications and US non-provisional patent applications cited herein.

In other implementations, the trunk cable 144 plugged into the first patch panel 108 is different from the trunk cable 144 plugged into the second patch panel 108. In some implementations, the two trunk cables 144 may be connected at a third patch panel. In other implementations, the two trunk cables 144 may be connected using a panel network of multiple patch panels and trunk cables. In still other implementations, multiple trunk cables may extend between the first and second patch panels 108. For example, in some implementations, multiple single optical fiber cables may extend between the patch panels 108 or panel network. In other implementations, multiple multi-fiber cables may extend between the patch panels 108 or panel network.

Non-limiting examples of patch panels suitable for use as panels 108 are shown and disclosed in U.S. patent application Ser. No. 13/025,750 and United States Publication No. US 2011-0116748, which were incorporated by reference above. Other non-limiting examples of patch panels suitable for use as panels 108 are shown and disclosed in United States Publication No. US 2011-0115494 A1, filed Oct. 19, 2010, and titled "MANAGED ELECTRICAL CONNECTIVITY SYSTEMS," U.S. application Ser. No. 12/905,689, filed Oct. 15, 2010, and titled "MANAGED CONNECTIVITY IN ELECTRICAL SYSTEMS AND METHODS THEREOF," U.S. Provisional Patent Application Ser. No. 61/466,696, filed Mar. 23, 2011, and titled "CABLE MANAGEMENT IN RACK SYSTEMS," and U.S. Provisional Patent Application Ser. No. 61/476,041, filed Apr. 15, 2011, and titled "MANAGED ELECTRICAL CONNECTIVITY SYSTEMS," which are hereby incorporated by reference herein in their entirety.

In the example shown in FIG. 1, the system 100 further comprises an aggregation point 152. The aggregation point 152, switches 104, and fiber patch panels 108 communicate with one another over a network 156. The aggregation point 152 is typically implemented as software that runs on a computer that is coupled to the network 156. The computer on which the aggregation point 152 is implemented includes an appropriate network interface to communicatively couple the computer to the network 156. In the example shown in FIG. 1, the programmable processors 136 and 142 in the switches 104 and fiber patch panels 108, respectively, are communicatively coupled to the network 156 by including a respective "management" or "non-service" port 158 that is separate from the "service" ports 106 and 138. However, one or more of the programmable processors 136 and 142 in the switches 104 and fiber patch panels 108, respectively, can be communicatively coupled to the network 156 using one or more of the "service" ports 106 and 138. In an example, the switches 104 can communicate with the aggregation point 152 using a suitable communication protocol (such as the Simple Network Management Protocol (SNMP) or a telnet session to obtain information via CLI).

In one embodiment, the network 156 comprises an INTERNET PROTOCOL network. The network 156 can be implemented using one or more of a local area network (LAN), a wide area network (WAN), the INTERNET, a virtual local area network (VLAN), and a virtual private network (VPN), an enterprise network, and a telecommunication service provider network. Moreover, the switches 104 and fiber patch panels 108 can be a part of the equipment used to implement the network 156.

The aggregation point 152 is configured to receive physical layer information pertaining to various devices and media used to implement the physical layer in the network 156 (not just the physical communication media 110). The physical layer information can be sent to the aggregation point over the non-service ports 106, 138. Physical layer information may also be manually supplied to the aggregation point 152.

The physical layer information (PLI) includes information about various devices in the network 156 (for example, information about the active optical modules 102, switches 104, and fiber patch panels 108) (also referred to here as "device information") as well as information about any physical communication media attached to the ports of those devices (also referred to here as "media information"). The device information includes, for example, an identifier for each device, a type identifier that identifies the device's type, and port information that includes information about the device's ports. The media information includes information that is read from storage devices that are attached to various physical communication media (for example, from the storage devices 132 that are attached to the physical communication media 110 and storage devices 150 that are attached to the optical trunk cables 144).

Examples of media information that can be stored in such storage devices 132, 150 include, without limitation, a cable identifier that uniquely identifies that particular physical communication media (similar to an ETHERNET Media Access Control (MAC) address but associated with the physical communication media (e.g., a serial number for the physical communication media)), a cable end identifier that identifies one end of the physical communication media from the other, a port insertion count, a cable end insertion count, as well as attribute information such as a part number, a plug or other connector type, a cable or fiber type (e.g., single mode, multimode) and length, fiber rating (e.g., om2, om3, om4, etc.), a cable polarity, a date of manufacture, a manufacturing lot number, information about one or more visual attributes of physical communication media or a connector attached to the physical communication media (such as information about the color or shape of the physical communication media or connector or an image of the physical communication media or connector), and other information used by an Enterprise Resource Planning (ERP) system or inventory control system. In other embodiments, alternate or additional data is stored in such storage devices as media information. For example, the media information can include testing, media quality, or performance information stored in such storage devices. The testing, media quality, or performance information, for example, can be the results of testing that is performed when a particular physical communication media is manufactured or installed.

The physical layer information can also include information about physical communication media that does not have any storage devices 132, 150 attached to it.

The aggregation point 152 includes a database or other data store (not shown) for storing the physical layer information provided to it. The aggregation point 152 also includes functionality that provides an interface for external devices or entities to access the physical layer information maintained by the aggregation point 152. This access can include retrieving information from the aggregation point 152 as well as supplying information to the aggregation point 152. In this example, the aggregation point 152 is implemented as "middleware" that is able to provide such external devices and entities with transparent and convenient access to the PLI maintained by the aggregation point 152. Because the aggregation point 152 aggregates PLI from the relevant devices in the network 156 and provides external devices and entities with access to such PLI, the external devices and entities do not need to individually interact with all of the devices in the network 156 that provide PLI, nor do such devices need to have the capacity to respond to requests from such external devices and entities.

The aggregation point 152, in this example, implements an application programming interface (API) by which application-layer functionality can gain access to the physical layer information maintained by the aggregation point 152 using a software development kit (SDK) that describes and documents the API.

The aggregation point 152 can aggregate the PLI from the devices and physical communication media to associate ports of devices (e.g., patch panels) with physical communication media. For example, the PLI can be used to associate a given port of a device with a given physical communication media and/or a particular connector of the physical communication media. Aggregating the PLI can include aggregating multiple such associations to determine physical layer connections between devices.

More information about physical layer information and the aggregation point 152 can be found in U.S. Provisional Patent Application Ser. No. 61/152,624, filed on Feb. 13, 2009, titled "MANAGED CONNECTIVITY SYSTEMS AND METHODS" and U.S. patent application Ser. No. 12/705,497, filed on Feb. 12, 2010, titled "AGGREGATION OF PHYSICAL LAYER INFORMATION RELATED TO A NETWORK", both of which are hereby incorporated herein by reference.

FIG. 2 is a block diagram of an example active optical module 102 and a physical communication media 110 suitable for use in the system shown in FIG. 1. The physical communication media 110 shown in FIG. 2 is a duplex fiber optical cable having a pair of fibers 112 (though it is to be understood that the techniques described here can be used with other types of fiber optic cables, such as simplex cables and/or simplex or duplex cables that implement more than one simplex or duplex optical channel).

Each physical communication media 110 has a first end 114 and a second end 116 with one or more optical fibers 112 therebetween. The first end 114 of the PCM 110 includes a passive fiber optic connector 118 attached thereto. The passive optical connector 118 can be connected to a pluggable active optical module 102 for communication with a host device 104. The passive optical connector 118 can pass optical signals between the fiber pair 112 and the active optical module 102. The active optical module 102 includes the active optical components that perform the electrical-to-optical (E/O) and optical-to-electrical (O/E) conversions for signals to be sent and received over a fiber pair 112 of a PCM 110 to and from a host device 104.

One example of a passive optical connector 118 is a duplex LC, SC, or MPO fiber connector. In other examples, the physical communication media 110 can be implemented in other ways (such as a simplex cable, a hybrid cable, a multi-channel cable, etc.), and the passive end 116 is implemented in a manner suitable for that type of cable (for example, using a simplex connector, a hybrid cable connector, or a multi-channel cable connector).

In this example, each passive optical connector 118 includes (or is otherwise associated with) a storage device 132. The passive optical connector 118 is configured to include a storage-device interface via which the storage device 132 can be accessed. This storage-device interface can be implemented by incorporating appropriate electrical contacts in the passive optical connector 118.

Various examples of storage-device interfaces are described in United States Patent Publication No. US 2011-0116748, filed Oct. 15, 2010, and titled "MANAGED CONNECTIVITY IN FIBER OPTIC SYSTEMS AND METHODS THEREOF," U.S. patent application Ser. No. 13/025,841, filed on Feb. 11, 2011, titled "MANAGED FIBER CONNECTIVITY SYSTEMS," and U.S. patent application Ser. No. 13/025,750, filed on Feb. 11, 2011, titled "COMMUNICATIONS BLADED PANEL SYSTEMS," U.S. Provisional Patent Application Ser. No. 61/152,624, filed on Feb. 13, 2009, titled "MANAGED CONNECTIVITY SYSTEMS AND METHODS," and U.S. patent application Ser. No. 12/705,497, filed on Feb. 12, 2010, titled "AGGREGATION OF PHYSICAL LAYER INFORMATION RELATED TO A NETWORK," all of which are hereby incorporated herein by reference. In some of these examples, a four-line storage-device interface is used, where the interface includes a single data line for reading and writing data, a power line for providing power to the storage device, a ground line for providing a ground level, and an extra line reserved for future use. Also, in these examples, a storage device that supports the UNI/O bus protocol is used, where the UNI/O bus protocol is used for communicating over the single data lead. One example of such a storage device and interface are the storage devices and interfaces used in the QUAREO™ family of physical layer management products that are commercially available from TE Connectivity.

The second end 116 of the PCM 110 can include either a passive fiber optic connector 118 or active optical connector. The examples of FIGS. 1 and 2 illustrate the second end 116 using a passive optical connector 118 including a storage device 132 and a corresponding storage device interface. Such a passive optical connector 118 can be connected to a corresponding pluggable AOM 102 for interfacing with a respective host device 104. In other examples, the second 116 of the PCM 110 can comprise an active optical connector. An active optical connector has an integrated active optical module integrated therein which includes active optical components that perform the electrical-to-optical (E/O) and optical-to-electrical (O/E) conversions necessary for signals to be sent and received over a fiber pair 112 of a PCM 110 to and from a host device 104.

In any case, a passive optical connector 118 on a PCM 110 can be connected to a pluggable active optical module 102 for communication with a host device 104. The active optical module 102 includes an optical adapter 260 configured to mate with the passive optical connector 118. The optical adapter 260 and the passive optical connector 118 are configured such that when the passive optical connector 118 is inserted into the adapter 260, optical signals can be coupled between the active optical module 102 and the physical communication media 110. The optical adapter 260 can have any suitable form such as a duplex LC, SC, or MPO adapter.

Each active optical module 102 includes an electrical connector 120 by which transmit and receive signals are input and output in electrical form (typically, as respective differential signal pairs) to and from the active optical module 102. The electrical connector 120 also includes contact traces for power (PWR) and (GND) lines for providing power and ground to the active components in the active optical module 102. In an example, the active optical module 102 comprises a Gigabit ETHERNET active optical module that implements one or more of the Institute of Electrical and Electronics Engineers (IEEE) 802.3 family of standards relating to 1, 10, or 40 Gigabit ETHERNET. In this example, the electrical connector 120 is implemented as an edge-type connector having contact traces for each of the lines required by the Gigabit ETHERNET standards relating to electrical Gigabit ETHERNET connectors (that is, TX− and TX+ contact traces for the "transmit" differential signal pair and RX− and RX+ contact traces for the "receive" differential signal pair). In one common application, the specifications for the active optical module 102 are not standardized by any official standards body but are specified by a multi-source agreement (MSA) between competing manufacturers. This is also referred to here as a "MSA compatible active optical module" or "MSA compatible transceiver". The electrical connector 120 and the rest of the active optical module 102 can be any suitable connector and module such as small form factor connectors and modules including MSA compatible connectors and modules such as a SFP, SFP+, QSFP, QSFP+, CFP, and CXP conforming connectors and modules as well as other types of active optical modules (for example, active optical modules other than MSA compatible active optical modules).

Each active optical module 102 includes the active optical components that perform the electrical-to-optical (E/O) and optical-to-electrical (O/E) conversions necessary for signals to be sent and received over a fiber pair 112 of a PCM 110 connected to an optical adapter 260. In the example shown in FIG. 2, the active optical module 102 includes an optical transceiver 222. The optical transceiver 222 comprises a receiver optical assembly (ROSA) 254 that receives a first optical signal from a first one of the optical fibers 112 and is part of the path that produces a first (received) electrical signal from the first optical signal suitable for outputting from the electrical connector 120. The optical transceiver 222 further comprises a transmitter optical assembly (TOSA) 252 that in the path that receives the electrical transmit signal from the electrical connector 120 and outputs a second (transmit) optical signal for communicating over the second one of the optical fibers 112. The received electrical signal and the transmit electrical signal can be output/supplied to the electrical connector 120. As noted above, in this example, the received electrical signal is output on the electrical connector 120 as a differential pair of electrical signals (RX+ and RX−) that complies with one or more of the IEEE 802.3 family of standards relating to 10 or 40 Gigabit ETHERNET. Likewise, the transmit electrical signal to be transmitted on the physical communication media 110 is supplied on the electrical connector 120 as a differential pair of electrical signals (TX+ and TX−) that complies with one or more of the IEEE 802.3 family of standards relating to 1, 10, or 40 Gigabit ETHERNET. The transceiver 222 also includes a controller 250 for controlling the operation of the TOSA 252 and ROSA 254. The controller 250 can include any suitable ASIC and can be coupled to one or more lines on the electrical connector 120 for communication with a host device 104.

The active optical module 102 also includes a programmable processor 256 coupled to a storage device 258. The programmable processor 256 can include any suitable programmable processor, such as a microprocessor, and the storage device 258 can be on a separate IC or can be incorporated one the same IC as the programmable processor 256. In an implementation of this example, the storage device 258 is an EEPROM, however, in other implementations other non-volatile memory can be used.

The active optical module 102 is also configured to obtain PLM information from the storage device 132 associated with the passive optical connector 118 that is inserted into the adapter 260 of the active optical module 102. The programmable processor 256 is configured to access the storage device 132 through a storage-device interface 262 associated with the adapter 260. The storage-device interface 262 is configured to mate and inter-operate with the storage device interface used in the passive optical connector 118 of the physical communication media 110. Software executing on the programmable processor 256 of the active optical module 102 is able to read and write data from and to the storage device 132 associated with any appropriate passive optical connector 118 that is connected to the adapter 260 using the storage-device interface 262. The software and programmable processor 256 can implement reading and writing to the storage device 132 in the US provisional patent application and US non-provisional patent applications cited herein.

Figure 3:
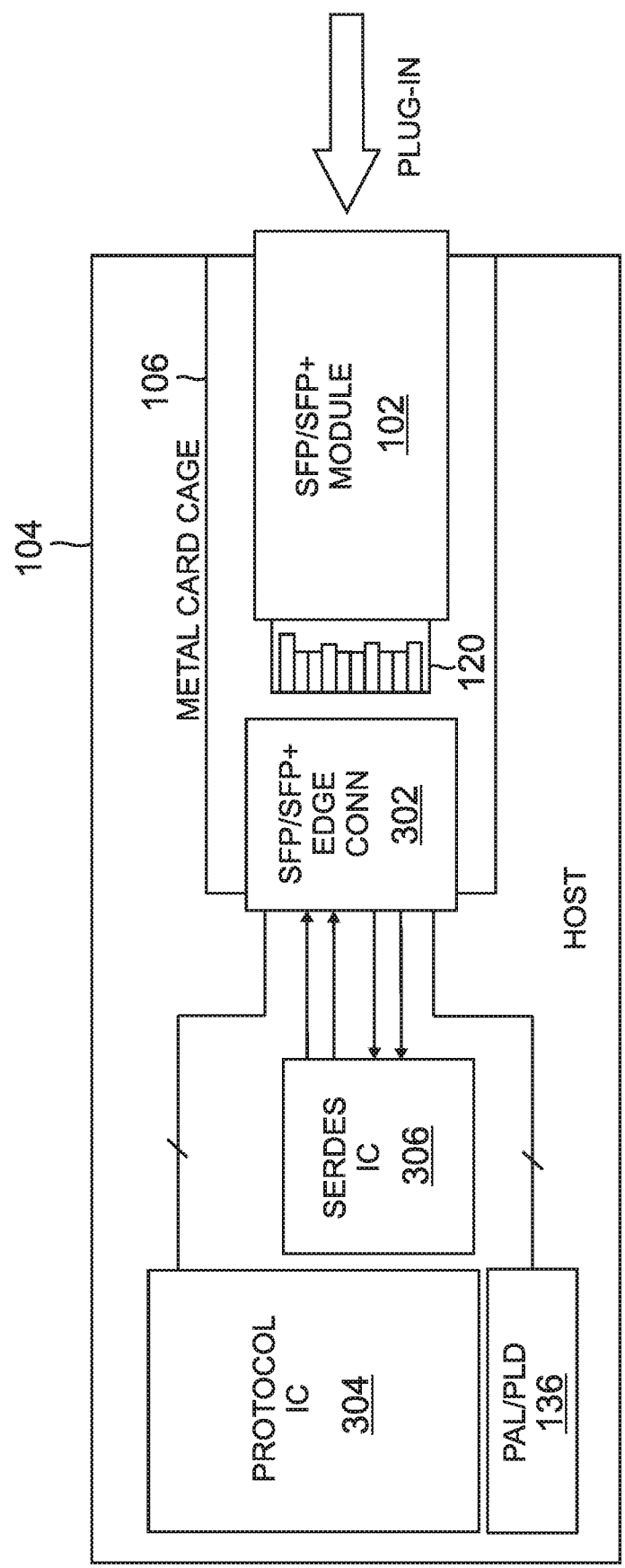
FIG. 3 is a block diagram of an example active optical module and host device suitable for use in the system of FIG. 1.

FIG. 3 illustrates a block diagram of an example active optical module 102 and host device 104 suitable for use in the system of FIG. 1. The active optical module 102 can be inserted into a port 106 of the host device 104. The electrical connector 120 of the active optical module 102 mates with an edge card connector 302 of the port 106 of the host device 102. The connection between the edge card connector 302 of the host device 104 and the electrical connector 120 of the active optical module 102 provides the electrical connection for signal, power, and data between the host device 104 and the active optical module 102.

The host device 104 includes a protocol integrated circuit 304 that is coupled to a first plurality of contacts in the edge card connector 302 and is configured to communicate with the controller 250 in the transceiver 222 of the active optical module 102 to control the electrical/optical conversion in the transceiver 222. A serializer/deserializer (SERDES) 306 in the host device 104 is coupled to a second plurality of contacts in the edge card connector 302 and provides transmit and receive signal paths for high speed data between the host device 104 and the active optical module 102. The receiver lines (RD+, RD−) are the differential receiver inputs to the SERDES 306 from the transceiver 222 of the active optical module 102. In an example, the receiver lines are AC coupled 100 Ohm differential lines which are terminated at the SERDES 306. The transmitter lines (TD+, TD−) are the differential transmitter outputs from the SERDES 306 to the transceiver 222 of the active optical module 102. In an example, AC coupling for the transmitter and receiver lines is done inside the active optical module 102.

A programmable processor 136 (such as a programmable array logic (PAL), programmable logic device (PLD), microcontroller, or microprocessor) in the host device 104 is coupled to a third plurality of contacts in the edge card connector 302 and implements an inventory interface between the host device 104 and the active optical module 102. The programmable processor 256 is coupled to contacts on the electrical connector 120 that correspond to the third plurality of contacts and, therefore, is coupled to the inventory interface of the host device 104. The programmable processor 256 of the active optical module 102 is configured to communicate with the programmable processor 304 of the host device 104 over the inventory interface.

Figure 4:
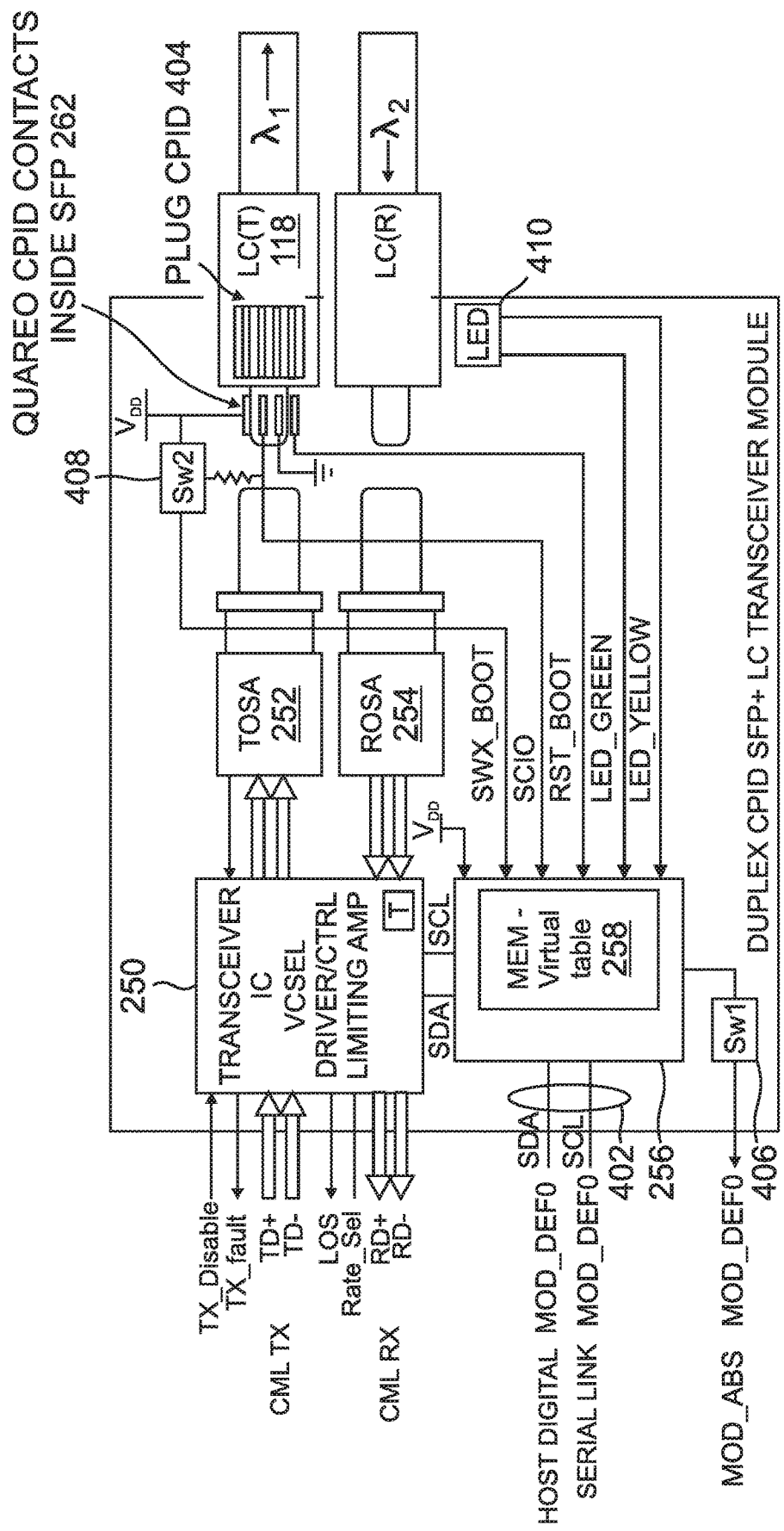
FIG. 4 is another block diagram of an example active optical module for use in the system of FIG. 1.

FIG. 4 is another block diagram of an example active optical module 102. The active optical module 102 includes one or more integrated circuits that implement a laser driver and controller 250 (such as a VCSEL driver) for the transmit side and a limiting amplifier for the receive side. The TOSA 252 is an assembly comprised of a VCSEL (or laser diode, a photo monitor diode, and a plastic or metal housing that supports the VCSEL and provides a sleeve to align an LC ferrule with the VCSEL. The VCSEL (or lase diode) and the photo monitor diode are housed in a metal transistor outline can (TO-CAN). The VCSEL (or laser diode) is the optical light source and the photo monitor diode is used to provide an intensity feedback (e.g., enables measurement of optical launch power) to the controller 250. The ROSA 54 is an assembly comprised of a positive-intrinsic-negative (PIN) photo detector diode, a transimpedance amplifier (TIA), and a plastic or metal housing that supports the PIN-TIA and provides a sleeve to align an LC ferrule to the PIN. The PIN-TIA will also be housed in a TO-CAN.

The controller 250 converts current mode logic (CML) transmitter (TD) inputs from the SERDES 306 of a host device 104 into a drive signal for a VCSEL or laser diode (electrical to electrical conversion). The controller 250 also controls the biasing levels to insure that the VCSEL or laser diode is operating in lasing mode. The controller 250 also converts the signal from the ROSA 254 and drives the CML lines for the receiver (RD) output (electrical to electrical conversion).

As mentioned above, the active optical module 102 also includes a programmable processor 256 and a storage device 258. Information in the storage device 258 can be accessed by a host device 104 over the inventory interface 402 implemented by the electrical connector 120 discussed above. The inventory interface 402 includes one "data" contact (DATA) and one "clock" contact (CLK) over which data and clock signals are exchanged between the programmable processor 136 of the host device 104 and the programmable processor 256 in the active optical module 102. In an example, the inventory interface 402 is a serial communication interface. In some examples, the programmable processor 136 and the programmable processor 256 implement the I²C (I-squared-C) bus protocol over the inventory interface 402.

The programmable processor 136 of the host device 104 is configured to access the storage device 258 indirectly via the programmable processor 256. The programmable processor 356 is configured to receive a command (for example, a read command or write command) from a host device 104 for the storage device 258 and take appropriate action and provide an appropriate response. For example, in response to a read command from the host device 104, the programmable processor 256 can access the storage device 258 to obtain the appropriate data (that is, with data corresponding to the memory locations or fields identified in the read command) and respond with the data in a format as though the data were from the storage device 128 directly. In response to a write command from the host device 104, the programmable processor 256 can store the corresponding information in the storage device 258. In an implementation of this example, the programmable processor 256 is transparent to the host device 104.

The storage device 258 includes information pertaining to the active optical module 102 of which the storage device 258 is a part. This information is referred to herein as active optical module (AOM) information. The AOM information is information intended for use by the host device 104 or a management system that is used to manage the host device 104. Typically, the AOM information is information that is prescribed by a manufacturer of the host device 104 and is controlled, at least in part, by an MSA.

An example use of AOM information is for authenticating the active optical module 102 to the host device 104. Many types of host devices 104 require an active optical module 102 to be authenticated before the ports 106 can be enabled for use with those active optical modules 102. The authentication could also be performed by a device other than host device 104. Example AOM information includes performance, calibration, boot firmware, and vendor proprietary information for the AOM 102. The AOM information can include an AOM identifier (for example, a serial number) that uniquely identifies the active optical module 102 of which the corresponding storage device 258 is a part. The AOM information can also include attribute information such as the bandwidth of the cable (for example 1 Gigabit, 10 Gigabit, 25 Gigabit, etc.) and a communication protocol(s) for which the active optical module 102 was designed. As used herein "PLM information" refers to information that is specifically intended for use by the aggregation point 152 (or, more generally, a PLM system) whereas "AOM information" refers to information that is intended for purposes other than use by an aggregation point 152 (or, more generally, a PLM system). The host device 104 can also store other information such as a connection table, routing table, media access control (MAC) addresses of other device, host MAC address, host identifier that the host is provided with or learns from other devices such as through a spanning tree protocol. This other information is also referred to herein as "other host information".

As discussed above with respect to FIG. 2, the programmable processor 256 can obtain PLM information from the storage device 132 associated with the passive optical connector 118 that is inserted into the adapter 260 of the active optical module 102. The programmable processor 256 is configured to access the storage device 132 through the storage-device interface 262 associated with the adapter 260. The storage-device interface 262 is configured to mate and inter-operate with the storage device interface 404 used in a passive optical connector 118 of a given physical communication media 110. Software executing on the programmable processor 256 of the active optical module 102 is able to read the write data from and to the storage device 132 associated with any appropriate passive optical connector 118 that is connected to the adapter 260 using the storage-device interface 262. The software and programmable processor 256 can implement reading and writing to the storage device 132 in the US provisional patent application and US non-provisional patent applications cited herein. Accordingly, the programmable processor 256 can obtain PLM information from the storage device 132 associated with the passive optical connector 118 when the passive optical connector 118 is inserted into the adapter 260.

In the example shown in FIG. 4, the storage-device interface 262 includes four contacts. The programmable processor is coupled to a first contact of the storage-device interface 262 over a first trace referred to herein as the "input/output line". The input/output line is used as a communication line (e.g., for serial communications) for communicating with (e.g., reading and writing information from/to) a storage device 132 coupled to the storage device interface 262. The input/output line is also used to detect the present of a passive optical connector 118 in the adapter 262. A second contact of the storage-device interface 262 is coupled to ground, and a third contact of the storage-device interface is coupled to a voltage rail (VDD). The second and third contacts provide power to the storage device 132 coupled to the storage-device interface 262.

The programmable processor 256 is coupled to a fourth contact of the storage-device interface 262 over a fourth trace referred to herein as the "reset line". The programmable processor 256 can be externally reset by receiving the appropriate signal on the reset line. For example, a diagnostic device can be coupled to the adapter 260 instead of a passive optical connector 118. The diagnostic device can have an interface corresponding to the storage-device interface 262. The diagnostic device can then send the appropriate signal (e.g., a voltage level) on the reset line to reset the programmable processor 256.

Upon reset or power up, the programmable processor 256 enters the boot loader mode. In this mode, the input/output line is operating as the transmit line of a universal serial asynchronous receiver transmitter (USART) port. The reset line discussed above, operates as the receive line for the USART port. In this manner the diagnostic device can, after resetting the programmable processor 256, communicate with the programmable processor 256 to, for example, provide updated firmware to the active optical module 102 without removing the active optical module 102 from the host device 104.

If no USART signals are received on the reset line, the boot loader mode of the programmable processor 256 expires after a period of time. Upon expiration of the boot loader mode, the reset line returns from a receive line of the USART port to a line for resetting the programmable processor 256 and the input/out line returns from a transmit line of the USART to a line for communicating with a storage device 132.

The programmable processor 256 is also coupled to a second switch 408. The second switch 408 is coupled to the third contact of the storage-device interface 262 and a resistor is coupled between the second switch 208 and the first contact of the storage-device interface 262. The second switch 408 is a tri-state switch and the programmable processor 256 is configured to switch VDD off and on to the input/output line by controlling the second switch 408. More information regarding the second switch 408 is provided with respect to FIGS. 10A-10D below.

One or more light emitting diodes (LEDs) 410 can also be included in the active optical module 102 and disposed such that the LEDs 410 are visible when the active optical module 102 is inserted into a host device 104. The programmable processor 256 can be coupled to the LEDs 410 over one or more traces that are used to drive the LEDs 410.

The PLM information from the storage device 132 can include a cable identifier as well as attribute information. The PLM information from the storage device 132 can be stored in memory locations of the storage device 258 that are not being used for AOM information. In one implementation of this example, the PLM information is stored in a location that, in addition to not being currently used for AOM information, is unlikely to be written over with AOM information by a host device 104.

For example, the information in a conventional storage device in an active optical module 102 is organized into a plurality of fields. The fields typically include fields that are required by the relevant MSA (also referred to here as "required fields") and fields that are not required by the relevant MSA (also referred to here as "user defined fields"). In one implementation of this example, the programmable processor 256 implements a virtual table in the storage device 258 including the fields of such a conventional storage device. The programmable processor 256 uses this virtual table to emulate a conventional storage device during communications with the host device 104 over the inventory interface 402.

The programmable processor 256 also stores PLM information in one or more of the user defined fields of the virtual table. For example, the manufacturer of the physical communication media 110 can define one or more of the user defined fields as including various PLM information. A first user defined field can be defined as including a cable identifier (as discussed above), and the particular cable identifier for the associated cable is accordingly stored in this first user defined field. In one implementation, an extended memory map defined by an MSA (e.g., memory map positions 127-247) is used to write messages and commands to/from the active optical module 102. For example, a command may be written in the extended memory map to set the dual color port LED 410 to solid green, amber, flash slow amber, or flash fast green, etc. This enables the management system to create and perform work orders in a similar manner to panel work orders. Other commands include, for example, requesting the programmable processor 256 to invoke software download mode, enter normal operation, reset module, reset port insertion count, write a user defined value to storage device 138, request specific inventory information to be written to AOM, for example, manufacture info, enable or disable 'invalid cable type' processing, enable or disable the data path for invalid cable types.

In other implementations, PLM information is included with AOM information in one or more of the required fields of the virtual table. For example, if the AOM information stored in a required field does not use all the memory space allocated to that field, the PLM information may be stored in the unused memory space of that field. A required field that is defined for an AOM identifier (that is, a serial number) can be used by encoding or otherwise storing information in that required field in a way that includes both the AOM identifier and the desired PLM information (for example, a cable identifier or universal code indicating no cable/connector connected). Moreover, the PLM information can be combined with the AOM information (e.g., the AOM identifier) in a manner that does not affect the use of the AOM information by the non-PLM processes of the host device 104.

In an example, the AOM identifier is stored in a vendor serial number field which is an MSA required field. According to the MSA, the vendor serial number field contains ASCII characters and is assigned a total of 16 bytes at locations 68-83 of the memory map of a storage device in an active optical module. In an implementation of this example, the AOM identifier uses only 8 bytes of the 16 bytes, allowing the other 8 bytes to be used for PLM information (e.g., a cable identifier). As an example, the PLM information in these other 8 bytes (and therefore is concatenated with the AOM identifier) is used to identify one or four states for the adapter 260 of the active optical module 102. The first state is that nothing is connected to the adapter 260. The second state is that an unmanaged cable/connector is connected to the adapter 260. The third state is that a managed cable/connector is connected to the adapter 260. The fourth state is than a managed cable/connector is connected to the adapter 260, but the managed cable/connector is of an invalid type. In the first and a second state, respective universal codes that can be stored in the second 8 bytes. That is, to indicate that nothing is connected to the adapter a first universal code (corresponding to no cable/connector connected) is stored in the second 8 bytes and to indicate that an unmanaged cable/connector is connected to the adapter 260 a second universal code (corresponding to an unmanaged cable connected) is stored in the second 8 bytes.

In the third state, PLM information (e.g., a cable identifier, cable end identifier) obtained from the storage device 132 associated with the passive optical connector 118 connected to the adapter 260 is stored in the second 8 bytes. In an implementation of this example, the PLM information, for the third state, stored in the second 8 bytes (addresses 76 to 83 in the memory map) are a cable identifier and a sub ID. The cable identifier is a 6 byte big endian, globally unique unsigned integer value. Each connector on the same cable contains the same cable identifier value. Therefore, endpoint connections of the same cable may be found by matching the cable identifier value. The sub ID contains a value to uniquely identify the cable end. Sub IDs are only unique within a cable assembly. The cable identifiers have no internal structure and can be consider a 6 byte long, contiguous unsigned integer value. The sub ID also has no internal structure.

In the fourth state, the PLM information (e.g., a cable identifier) can be stored. In some implementations, a third universal code indicating that an invalid cable type is connected can be stored in the second 8 bytes (addresses 76 to 83 in the memory map) and the cable identifier can be placed in an unused field (e.g., in locations 95-126 of memory 258). Other examples are also possible. In this example, additional PLM information (such as fiber category indicating single mode, multimode, fiber rating indicating OM3, OM4, etc. cable length, cable color, and manufacturing information) regarding the cable connected to the adapter 260 can be stored in the vendor specific area of the memory map (of the emulated storage device in the active optical module 102, e.g., memory locations 95-126).

In an example, the active optical module 102 toggles the module present pin of the host device 104 in response to every change of state (i.e., first, second, third, fourth state discussed above). In this way, the updated PLM information captured/generated by that change of state is captured by the host device 104 and can be aggregated by the aggregation point 152.

In some implementations, PLM information is stored in unallocated memory locations. That is, the PLM information is stored in memory locations that are not part of any defined field.

As mentioned above, the host device 104 is configured to access the storage device 258 through the inventory interface 402 to obtain the AOM information stored therein. After accessing the storage device 258, the host device 104 can store some or all of the AOM information on a local storage device or memory on the host device 104. In an implementation of this example, the AOM information can be stored in a MIB by an SNMP agent running on the host device 104. The AOM information stored in the MIB can include the AOM identifier discussed above.

The host device 104 can also obtain the PLM information stored in the virtual table of the storage device 258. The programmable processor 256 emulates a conventional storage device and includes the PLM information in communications to the host device 104 such that a legacy host device 104 will (automatically) read the PLM information when it reads the AOM information. That is, the PLM information the programmable processor 256 emulates a conventional storage device such that the host device 104 does not need to be updated (for example, no hardware or software modifications) in order to obtain the stored PLM information or the AOM information.

In one implementation of this example, the host device 104 can (automatically) obtain the PLM information based on information (for example, a header) in the virtual table of the storage device 258 which indicates that there is data in one or more user defined fields in the storage device 258. Upon reading the header and recognizing that there is data in one or more user defined fields, the host device 104 can access the locations on the virtual table of the storage device 258 corresponding to the user defined fields to obtain the information therein. In another implementation, the host device 104 can be configured to obtain all information in the locations of the virtual table of the storage device 258 dedicated to the user defined fields whether or not the user defined fields are actually used (that is, whether or not there is information stored in the locations corresponding to the user defined fields). In this way, the host device 104 can (automatically) obtain any PLM information stored in the user defined fields. In yet another implementation, the host device 104 can be configured to (automatically) obtain all information in all memory locations stored in the virtual table of the storage device 258 and can thereby obtain the PLM information whether the PLM information is stored in a user defined field(s) or an unallocated memory location. In implementations where the PLM information is stored in one or more required fields of the virtual table (that is, fields required by the relevant MSA) the host device 104 can (automatically) obtain the stored PLM information when the host device 104 obtains the AOM information in the corresponding field.

As mentioned above, the PLM information can be provided to the host device 104 in a transparent manner implemented by the programmable processor 256 of the active optical module 102. The host device 104 can send a command over the inventory interface 402 configured to access the storage device 258 in the active optical module 102. The programmable processor 256 can retrieve the requested data (data requested in the command from the host device 104) from the virtual table of the storage device 258. In addition the requested data (for example, AOM information), the programmable processor 256 can include PLM information in the response to the command. In one implementation of this example, the programmable processor 256 inserts the PLM information into the response in a manner that is transparent to the host device 104.

For example, the aggregation point 152 can send an SNMP write request to the host device 104 instructing the host device 104 to write to the user/host writable area (e.g., memory locations 127-247) of the virtual table some requested data bytes. In response to the request, the host device 104 sends a write to the AOM module 102 to write the requested data bytes to the requested location. The programmable processor 256 receives the write from the host device 104 and interprets the requested data bytes as a message. The message can be instructions to perform an action such as set an LED value, write inventory values to certain memory locations, etc. The message can also be a request to retrieve information, such as PLM information from storage device 132. In this way, aggregation point 152 is able to communicate with the active optical module 102.

Since the host device 104 is configured to communicate with a storage device in the active optical module 102, the host device 104 is configured to receive responses that are formatted as described above (e.g., according to the MSA defined memory maps). In some examples, the host device 104 does not perform any additional formatting other than that defined by the MSA. For example, the host device 104 can be configured to access information from a storage device that is formatted in accordance with a relevant MSA into required fields and user-defined fields. Other organization structures can also be used. In one implementation of this example, the programmable processor 256 can insert the PLM information into a user defined field. In one implementation, the programmable processor 256 can provide information (for example, appropriate header information) indicating that one or more of the user defined fields are present in the virtual table. This can prompt the host device 104 to request the one or more user defined fields and the programmable processor 256 can provide the information corresponding to the user-define field (which can include the PLM information) to the host device 104 in response to such a request. Alternatively, the programmable processor 256 can provide the PLM information as information stored in unallocated memory locations of the emulated storage device in a similar manner. In another implementation, the programmable processor 256 can concatenate, encode, or otherwise include the PLM information with AOM information corresponding to a required field in the emulated storage device. For example, the programmable processor 256 can provide the PLM information with an AOM identifier in a field that is defined for the AOM identifier. The PLM information (for example, a cable identifier and a cable end identifier), or a portion thereof, can be concatenated with the AOM identifier and provided to the host device in portions of the field that are not used by the AOM identifier.

In some implementations, the programmable processor 256 can be configured to provide different PLM information in response to different commands from the host device 104. For example, the particular PLM information that is provided to the host device 104 can be determined based on the memory location of the virtual table that the host device 104 is attempting to access. This approach is also referred to here as an "addressed-based scheme". In other implementations, the PLM information can be provided based on a timing or sequencing of the commands from the host device 104. For example, the programmable processor 256 can implement a state-based process flow in which first PLM information (for example, a first portion of a cable identifier) is provided in response to a first command and second PLM information (for example, a second or remaining portion of the cable identifier) can be provided in response to a second command. This approach is also referred to here as a "state-based scheme". In some implementations, the PLM information can be provided using both an addressed-based scheme and a state-based scheme. For example, in response to a first command attempting to access a first memory address (for example, corresponding to an AOM identifier) first PLM information can be provided, and in response to a second command attempting to access a second memory address no PLM information can be provided, and in response to a second message attempting to access the first memory address second PLM can be provided. That is, in response to a first and second command to access a first memory address, the processor 256 can provide first and second PLM information. This state-based scheme can be used as a logical communication channel between the aggregation point 152 and the programmable processor 256 with the aggregation point 152 controlling the process flow via messages (for example, SNMP messages) to the host device 104. The aggregation point 152 and the programmable processor 256 can implement corresponding state-based process flows. For example, the aggregation point 152 can send a first SNMP request to the host device 104 causing the host device 104 to send a corresponding message to the programmable processor 256 (for example, attempting to access a first memory address of the virtual table). The programmable processor 256 can respond by providing first PLM information to the host device 104. The host device 104 can then send the first PLM information to the aggregation point 152 in response to the SNMP request. The aggregation point 152 can send another SNMP request (which may be the same as the first SNMP request) to the host device 104 again causing the host device 104 to send a corresponding message to the programmable processor 256. If this second message is received before a timeout of the state of the programmable processor 256, the programmable processor 256 can respond by providing second PLM information to the host device 104. If no messages are received before a timeout of a corresponding state, the programmable processor 256 and aggregation point 152 can return to an initial state. In this manner, the programmable processor 256 and the aggregation point 152 could communicate PLM information as desired.

The inventory interface 402 of the active optical module 102 can be implemented over a first one or more contacts in the electrical connector 120 of the active optical module 102. The active optical module 102 can also include a first switch 406 coupled between a second contact (distinct from the first one or more contacts) of the electrical connector 120 and ground. The second contact is configured to contact a corresponding contact on the host device 104. This corresponding contact is referred to as the "active optical module present pin" ("AOM present pin"), because it is used to determine whether there is an active optical module 102 present in the port 106. For example, legacy active optical modules are configured to couple the second contact to ground, such that if the active optical module is inserted into a port of the host device 104, the second contact of the electrical connector 120 will contact the AOM present pin of the host device 104 pulling the voltage state of the AOM present pin to a logic zero. The host device 104 can then determine than an active optical module is present in that particular port by identifying that the AOM present pin for that particular port is at a logic zero (ground). The first switch 406 can selectively couple the second contact to ground. The programmable processor 256 is coupled to the first switch 406 and configured to control whether the first switch 406 couples the second contact to ground. In an example, the programmable processor 256 is configured to set the first switch 406 into one of two states, the first state is coupling the second contact to ground and the second state is to provide an open connection (i.e., floating) for the second contact.

The host device 104 is configured to read information in the virtual table of the storage device 258 in response to detecting insertion of the active optical module 102. In an example, the host device 104 can detect insertion of the active optical module 102 by identifying a change in the voltage state of the AOM present pin from open (floating) to ground (logic 0). In response to identifying such a change, the host device 104 can attempt to read information from the virtual table of the storage device 258 in the active optical module 102. The host device 104 is configured to read AOM information from the active optical module 102 for authentication of the active optical module 102 or other purposes as discussed above.

Also as discussed above, the active optical module 102 is configured to access PLM information from a storage device 132 of a passive optical connector 118 inserted into an adapter 260 of the active optical module 102. In an example, the active optical module 102 is configured to read PLM information from the storage device 132 in response to detection insertion of the passive optical connector 118 into the adapter 260. The active optical module 102 can then store the PLM information in the virtual table of the storage device 258 as discussed above.

Typically, the active optical module 102 will be inserted into a port of the host device 104 before the passive optical connector 118 of a PCM 110 is inserted into the adapter 260 of the active optical module 102. Accordingly, the PLM information from the storage device 132 will not be stored in the virtual table of the storage device 258 of the active optical module 102 at the time in which the host device 104 reads the AOM information from the storage device 258. Thus, the programmable processor 258 of the active optical module 102 will not be able to provide the PLM information from the storage device 132 along with the AOM information with the response to the read request from the host device 104. The active optical module 102 (in particular the programmable processor 256), however, is configured to simulate an insertion of itself into the port 106 of the host device 104 by toggling the voltage state on the second contact. To toggle the voltage state, the programmable processor 256 can set the switch 406 to an open connection for a period of time and thereafter, set the switch to couple the second contact to ground. Upon sensing that the AOM present pin has transitioned from an open state to a ground state, the host device 104 will determine that an active optical module 102 has been inserted into the port 106 and attempt to read from the storage device 258. In response to the read request from the host device 104, the programmable processor 256 can include all or a portion of the PLM information from the storage device 132 in a response to the host device 104. The PLM information can be included in addition to the AOM information requested by the host device 104 in any of the manners discussed above.

The active optical module 102 can control the timing of the toggles of the voltage state on the second contact in order to cause the host device 104 to read information from the storage device 258. In particular, the active optical module 102 can control the timing such that desired PLM information from the storage device 132 is provided to the host device 104. For example, after any new PLM information is obtained from the storage device 132 (e.g., in response to detecting insertion of a passive optical connector 118) the active optical module 102 can toggle the switch 406 (and therefore toggle the voltage state of the second contact and AOM present pin) to cause the host device 104 to read from the storage device 258. The programmable processor 256 can then insert the new PLM information in the response to the host device 104 in any of the manners described above. In this way, the active optical module 102 can cause the host device 104 to obtain PLM information therefrom. This information can then be accessed by the aggregation point 152 as discussed below. In an example, the active optical module 102 is configured to toggle the switch 406 and to provide updated (new) PLM information to the host device 104 in response to detecting insertion of a passive optical connector 118 into an adapter 260 of the active optical module 102. Thus, PLM information from a storage device 132 in a passive optical connector 118 inserted into the adapter 260 can be passed from the active optical module 102 to the host device 104 and to the aggregation point 152. In this way, the PLM information from a passive optical connector 118 that is newly inserted into an adapter 260 can be captured and aggregated by the aggregation point 152. Thus, when a PCM 110 is disconnected from an adapter 260 and another (or the same) PCM 110 is reconnected to the adapter 260 the PLM information from the newly connected PCM 110 can be captured and aggregated by the aggregation point 152. In an example, the active optical module 102 is configured to toggle the switch 406 to implement state-based communication with the aggregation point 152 as described above.

In an example, the active optical module 102 (in particular the programmable processor 256) is configured to store PLM information in the storage device 258 indicating that the passive optical connector 118 connected to the adapter 260 does not have a storage device 132 associated therewith. That is, the active optical module 102 is configured to store PLM information indicating that the passive optical connector 118 is unmanaged. For example, the active optical module 102 can detect that a passive optical connector 118 has been inserted into the adapter 260 and attempt to read from a storage device 132 via the storage-interface 262. If the passive optical connector 118 is unmanaged, no storage device 132 will be coupled to the storage-device interface 260 and the read operation performed by the programmable processor 256 will return null. The programmable processor 256 will then store PLM information that indicates an unmanaged passive optical connector. The programmable processor 256 can then toggle the first switch 406 and this PLM information can be provided to the host device 104 in any of the manners described above.

In any case, PLM information can be provided to the host device 104 by the programmable processor 256. Advantageously, the above implementations may be configured to operate transparently to the host device 104 (that is, the host device 104 does not need to be updated or otherwise modified to support the communication of such PLM information or to use the modified active optical modules 102).

The aggregation point 152 (shown in FIG. 1) is configured to obtain the AOM identifier, PLM information, and/or other AOM information obtained by the host device 104. In an implementation of this example, the aggregation point 152 is configured to obtain the AOM information, PLM information, and/or other host information by sending a SNMP request or other request to the host device 104 (for example, the SNMP agent running thereon) requesting that the host device 104 send the AOM information, the PLM information (e.g., the entire contents of the MIB), and/or the other host information to the aggregation point 152. The host device 104 can be configured to respond to a request from the aggregation point 152 to access a particular field and/or a particular memory location in the virtual table of the storage device 258 to obtain the PLM information stored therein. The PLM information (for example, the cable identifier) along with its corresponding port number can therefore be provided from the host device 104 to the aggregation point 152.

In another implementation, instead of interacting directly with the host device 104, the aggregation point 152 interacts with another entity in the system 100 (for example, a management system that is used to manage the host device 104) that has already obtained such information from the host device 104 (either directly or via another source). In such an alternative implementation, the aggregation point 152 can be configured to use an API implemented by the other entity to obtain the AOM/PLM information from the host device 104. Typically, the other host information includes port numbers (or other identifiers) for the respective ports in which the various active optical modules 102 corresponding to the AOM information are connected. In an implementation of this example, the port number can be obtained by the same or a different request from the aggregation point 152 or using the API behind the software managing the host device 104 as described above.

The aggregation point 152 can be configured to itself discover any changes in the state of the ports at each host device 104. This can be done by configuring the aggregation point 152 to periodically (or as manually instructed) obtain the AOM/PLM information and its associated port for each host device 104 and to compare the current state of the ports of the host device 104 with a previous state of those ports. Also, where each host device 104 includes pre-existing functionality for reporting changes in the state of its ports (for example, using SNMP traps), the aggregation point 152 can be configured to use such functionality to detect changes in state of the ports 152. Typically, the aggregation point 152 will be configured to use a combination of such approaches for determining the state of the ports of the host device 104.

The aggregation point 152 can use the AOM/PLM information (for example, the AOM identifier) and/or the other information (for example, the port number) to associate the corresponding active optical module 102 with the port 106 to which the active optical module 102 is connected (or more generally the other host information). The aggregation point 152 can use the PLM information (for example, the cable identifier) from the storage device 132 in the first end 114 of the PCM 110 (which is accessed via the active optical module 102, in particular, the programmable processor 256) to associate the port 106 of the host device 104 to which the active optical module 102 is connected with the physical media 110 which is connected to the adapter 260 of the active optical module 102.

In this example, the passive optical connectors 118 on the second end 116 of the PCM 110 is inserted into a port 138 of a patch panel 108 or other passive device. The PLM information (e.g., the cable identifier) from the storage device 132 associated with the passive optical connector 118 of the second end 116 can be obtained by the aggregation point 152 via the patch panel 108 or other passive device in the manner described above with respect to FIG. 1. Accordingly, the aggregation point 152 can associate the passive optical connector 118 of the second end 116 and/or the physical communication media 110 with the corresponding port 138 of the patch panel 108. The aggregation point 152 can then associate the cable identifier (and therefore the corresponding physical communication media 110) with a port 138 of the patch panel 108 as described above. In this manner the aggregation point 152 can determine the physical layer connection from a particular port 138 of the patch panel 108 to a particular port 106 of the host device 104.

Advantageously, incorporating a storage-device interface 262 in an active optical module 102 and enabling the PLM information from a corresponding storage device 132 to be provided to the aggregation point 152 can enable the physical layer connection to be identified from a given port 138 of a patch panel 108 to a given port 106 of a host device 104 without requiring changes to the host device 104 or the physical communication media 110. A simple replacement of a legacy pluggable active optical module with the active optical module 102 can provide the physical layer management capability.

In another implementation, another active optical module 102 is used at the second end 116 of the physical communication media 110 such that the physical communication media 110 is coupled to two active optical modules 102, one on each end. In this implementation, the combination of the active optical modules 102 and the physical communication media 110 can be connected between two host devices 104 and used to provide physical layer management capability for the connection between the two host devices 104.

For example, a first passive optical connector 118 of the physical communication media 110 can be connected to a first active optical module 102. A second passive optical connector 118 of the physical communication media 110 can be connected to a second active optical module 102. The first active optical module 102 can be connected (via its electrical connector 120) to a port of a first host device 104. The second active optical module 102 can be connected (via its electrical connector 120) to a port of a second host device 104. The first host device 104 and the second host device 104 can send and receive signals over the combination of active optical modules 102 and the physical communication media 110. Additionally, in the manner described above, the aggregation point 152 can obtain PLM information from a first storage device 132 associated with the first passive optical connector 118 of the physical communication media 110 and information on the port of the first host device 104 in which the first active optical module 102 is inserted. The aggregation point 152 can also obtain PLM information from a second storage device 132 associated with the second passive optical connector 118 of the physical communication media 110 and information on the port of the second host device 104 in which the second active optical module 102 is inserted. The aggregation point 152 can aggregate this information to associate the port (in which the first active optical module 102 is inserted) of the first host device 102 with the port (in which the second active optical module 102) is inserted of the second host device 102 and determine the physical layer connection between the ports.

If the active optical module 102 is disconnected from a port 106 of the host device 104 and re-connected to a different port of the host device 104, or if the passive optical connector 118 is disconnected from the adapter 260 of the active optical module and a different (or the same) passive optical connector 118 is reconnected to the adapter 260, the aggregation point 152 will learn of these changes in the state of the ports 106/adapters 260 using the state discovery techniques described above. In response to the state changes, the aggregation point 152 can obtain the "new" AOM information, PLM information, and/or other host information as well as its corresponding port number and associate the two as described above. This association would include de-associating the AOM information and/or PLM information with the former port number.

Figure 10A:
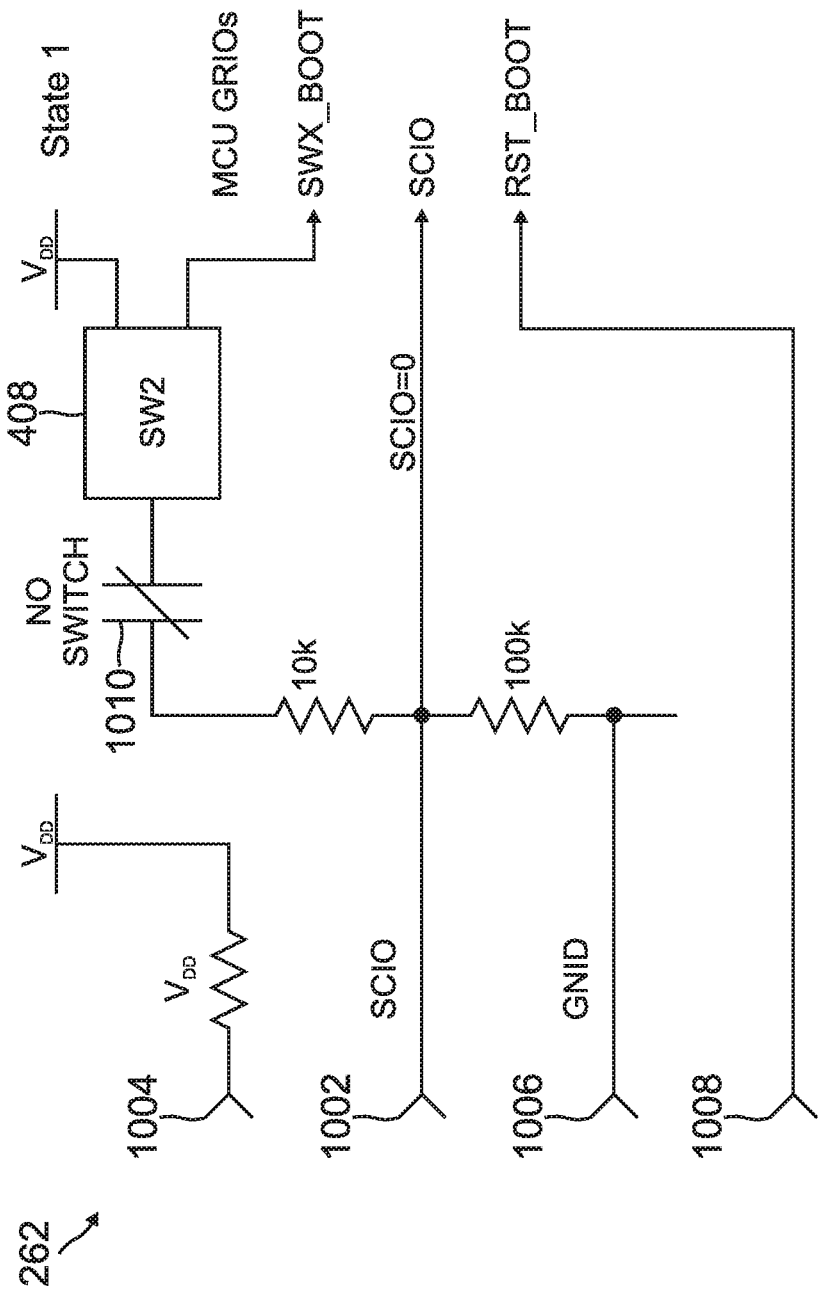
FIGS. 10A-10D are circuit diagrams of examples of different states of a storage-device interface for an active optical module of FIG. 2.

FIGS. 10A-10D illustrate example circuit diagrams of different states of the storage-device interface 262. FIG. 10A illustrates the storage-device interface 262 when a passive optical connector 118 is not inserted therein. As discussed above with respect to FIG. 4, the storage-device interface 262 includes four contacts. A first contact 1002 is coupled to the input/output line, a second contact 1004 is coupled to a voltage rail (VDD), a third contact 1006 is coupled to ground, and a fourth contact 1008 is coupled to the reset line. The storage-device interface 262 also includes a normally open (NO) switch 1010 coupled between the second switch 408 and the input/output line. The normally open switch is a mechanical switch that is configured such that it is open while a passive optical connector 118 is not connected to the adapter 260 and is closed while a passive optical connector is connected to the adapter 260. In the closed state the output from the second switch 408 is coupled to the input/output line. In the open state, the output from the second switch 408 is not coupled to the input/output line. The second switch 408 is coupled between the normally open switch 1010 and the voltage rail (VDD). The programmable processor 256 is also coupled to the second switch 408 and is configured to control the state of the second switch 408. In a first state of the second switch 408, the VDD is not coupled to the normally open switch 408, in a second state, VDD is coupled to the normally open switch 1010. Thus, if either the second switch 408 is in the first state or the normally open switch 1010 is open, VDD is not coupled to the input/output line. If, however, the second switch 408 is in the second state and the normally open switch 1010 is closed, VDD is coupled to the input/output line.

FIG. 10A illustrates the storage-device interface 262 when a passive optical connector 118 is not connected to the adapter 260. In this state, the normally open switch 1010 is set at an open state and VDD is not coupled to the input/output line. The input/output line is pulled to a logic low via a large value (e.g., 100 KOhm) resistor between the input/output line and ground. A, for example, 10 KOhm pull-up resistor is coupled in series between the normally open switch 1010 and the input/output line for current limiting to protect against a short circuit if a metallic test plug is inserted into the adapter 260. In this state, the programmable processor 256 senses a logic low on the input/output line indicating that no passive optical connector 118 is connected to the adapter 260. Additionally, in this state, while a passive optical connector 118 is not connected to the adapter 260, the programmable processor 256 of the active optical module 102 sets the second switch 408 to coupled the VDD to the normally open switch 1010. This is used to detect when a passive optical connector 118 is inserted into the adapter 260. When a passive optical connector 118 is inserted into the adapter 260, the normally open switch 1010 will be closed and VDD will be coupled to the input/output line. While a passive optical connector 118 is not connected to the adapter 260, the programmable processor 256 monitors the input/output line to detect when VDD is coupled thereto and, therefore, to detect when a passive optical connector 118 can be connected to the adapter 260.

Figure 10B:
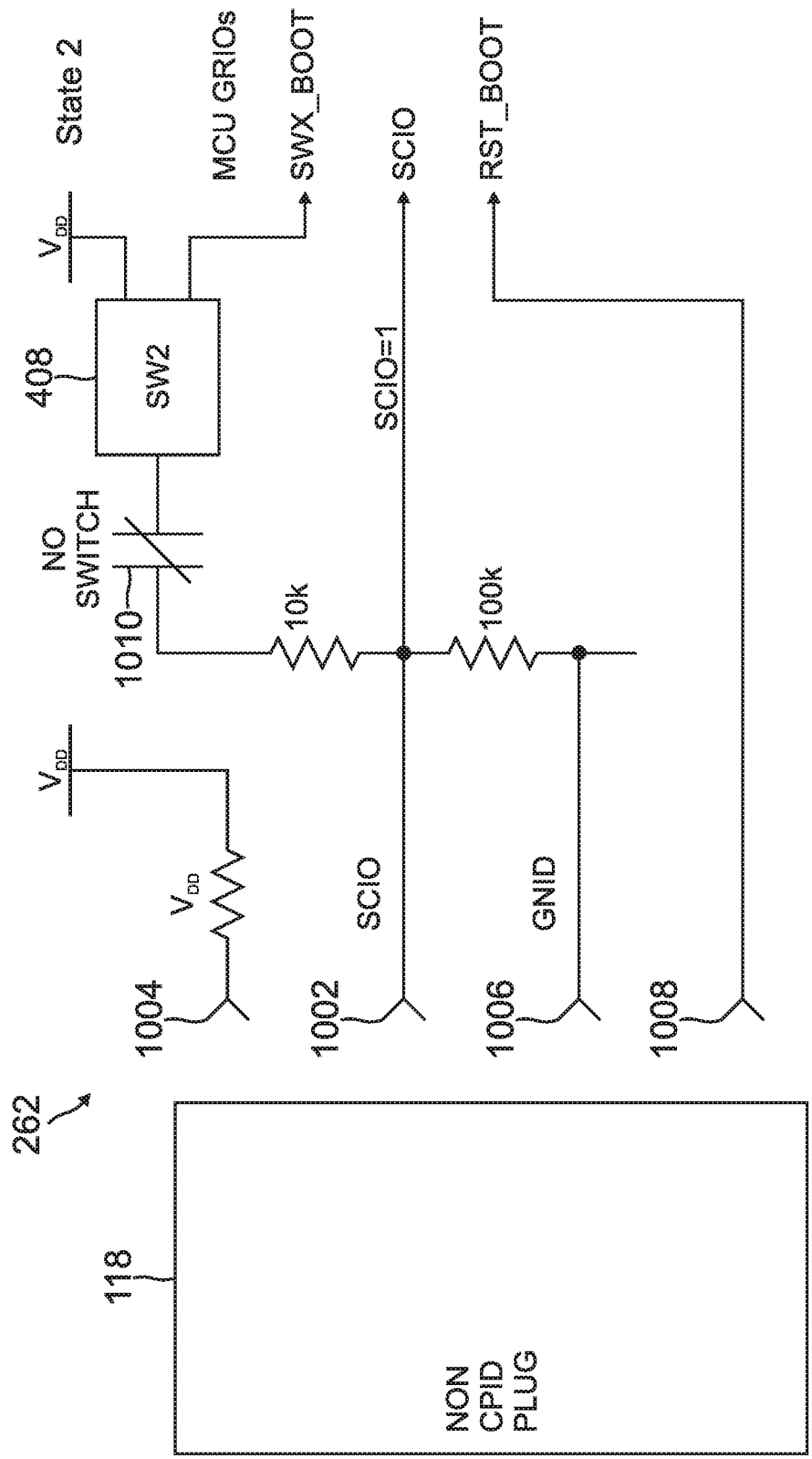

FIG. 10B illustrates the storage-device interface 262 with an unmanaged passive optical connector 118 connected to the adapter 260. As shown, while the passive optical connector 118 is connected to the adapter 260, the normally open switch 1010 is closed. Since the second switch 408 is set to couple VDD to the normally open switch 1010 while a passive optical connector 118 is not connected to the adapter 260 (as shown in FIG. 10A), when the passive optical connector 118 is inserted into the adapter 260 and the normally open switch 1010 is closed, VDD is coupled to the input/output line. The programmable processor 256 detects VDD on the input/output line indicating that a passive optical connector 118 is connected to the adapter 260. The change in state of the input/output line from low to high logic indicates that a passive optical connector 118 has been inserted in the adapter 260. In response to detecting that a passive optical connector 118 has been inserted into the adapter 260, the programmable processor 256 sets the second switch 408 to the first state such that VDD is no longer coupled to the input/output line. The programmable processor 256 then attempts to read from a storage device 132 if one is associated with the passive optical connector 118. In the example shown in FIG. 10B, the passive optical connector 118 is unmanaged so there is no storage device 132 associated therewith. Accordingly, null is received by the programmable processor 256 in response to the read. The programmable processor 256 determines based on this null that the passive optical connector 118 connected to the adapter 260 is unmanaged. The programmable processor 256 can then generate and store PLM information indicating that the passive optical connector 118 connected to the adapter 260 is unmanaged. In response to receiving a null command and determining that the unmanaged passive optical connector 118 is unmanaged, the programmable processor 256 can then set the second switch 408 back to the second state such that VDD is coupled to the input/output line. The programmable processor 118 can then monitor the input/output line to detect when VDD is no longer coupled to the input/output line and, therefore, when the unmanaged passive optical connector 118 is no longer connected to the adapter 260. In particular, when the unmanaged passive optical connector 118 is removed from the adapter 260, the normally open switch 1010 opens thereby decoupling VDD from the input/output line.

Figure 10C:
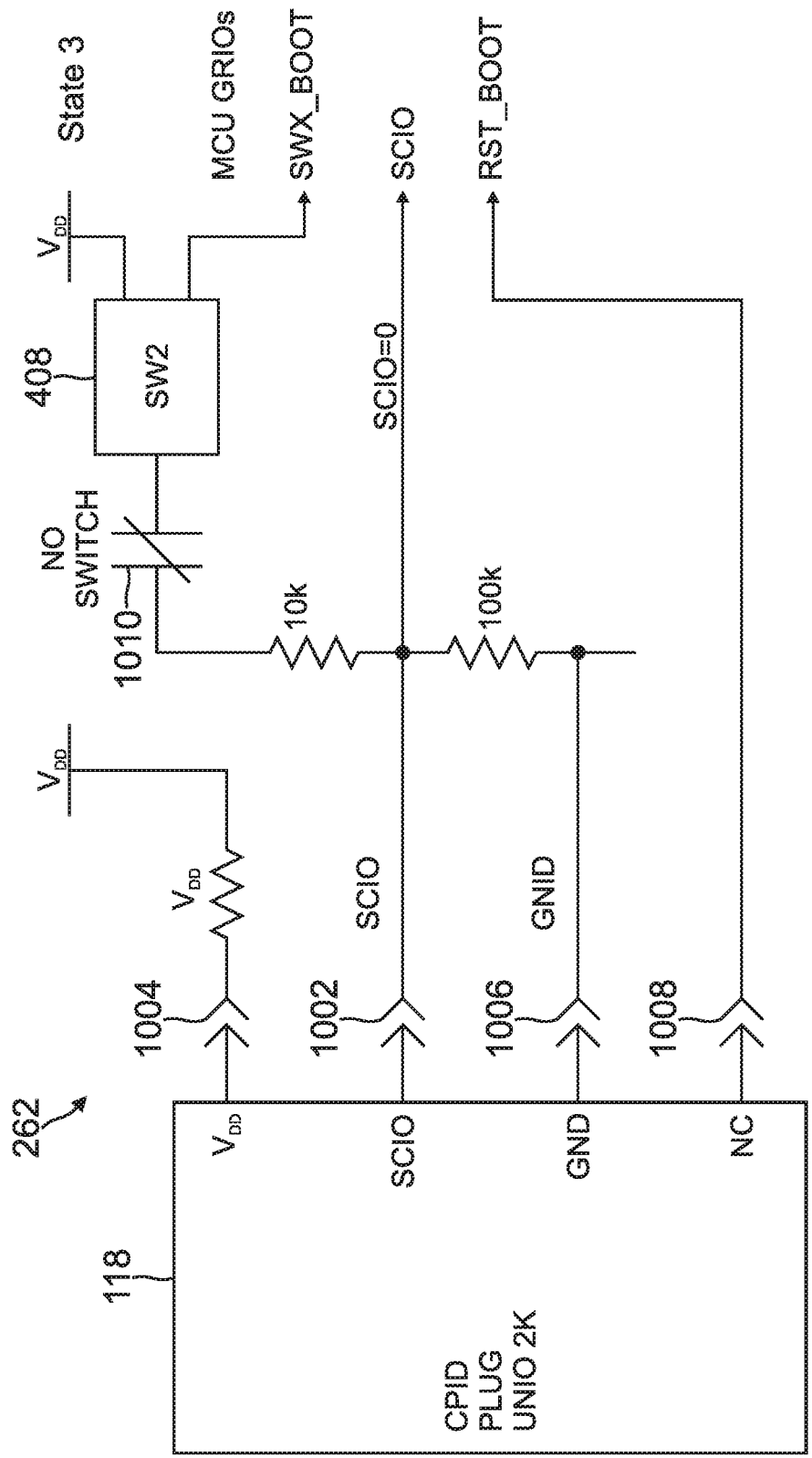

FIG. 10C illustrates the storage-device interface 262 with a managed passive optical connector 118 connected to the adapter 260. As shown, while the passive optical connector 118 is connected to the adapter 260, the normally open switch 1010 is closed. Since the second switch 408 is set to couple VDD to the normally open switch 1010 while a passive optical connector 118 is not connected to the adapter 260 (as shown in FIG. 10A), when the passive optical connector 118 is inserted into the adapter 260 and the normally open switch 1010 is closed, VDD is coupled to the input/output line. The programmable processor 256 detects VDD on the input/output line indicating that a passive optical connector 118 is connected to the adapter 260. The change in state of the input/output line from low to high logic indicates that a passive optical connector 118 has been inserted in the adapter 260. In response to detecting that a passive optical connector 118 has been inserted into the adapter 260, the programmable processor 256 sets the second switch 408 to the first state such that VDD is no longer coupled to the input/output line. The programmable processor 256 then attempts to read from a storage device 132 if one is associated with the passive optical connector 118. In the example shown in FIG. 10A, a storage device 132 is associated with the passive optical connector 118 and coupled to the storage-device interface 262. The programmable processor 256 then reads from the storage device 132 to obtain PLM information therefrom. The PLM information (e.g., a cable identifier and a cable end identifier) obtained from the storage device 132 is stored in the virtual table of the storage device 258 and is provided to the host device 104 as discussed above. The programmable processor 256 can also write information to the storage device 132, such as an update to the insertion count maintained in the storage device 132. The programmable processor 256 can determine when the passive optical connector 118 is disconnected from the adapter 260 in the manner described above with respect to FIG. 10B or by detecting when communication is no longer available with the storage device 132.

Figure 10D:
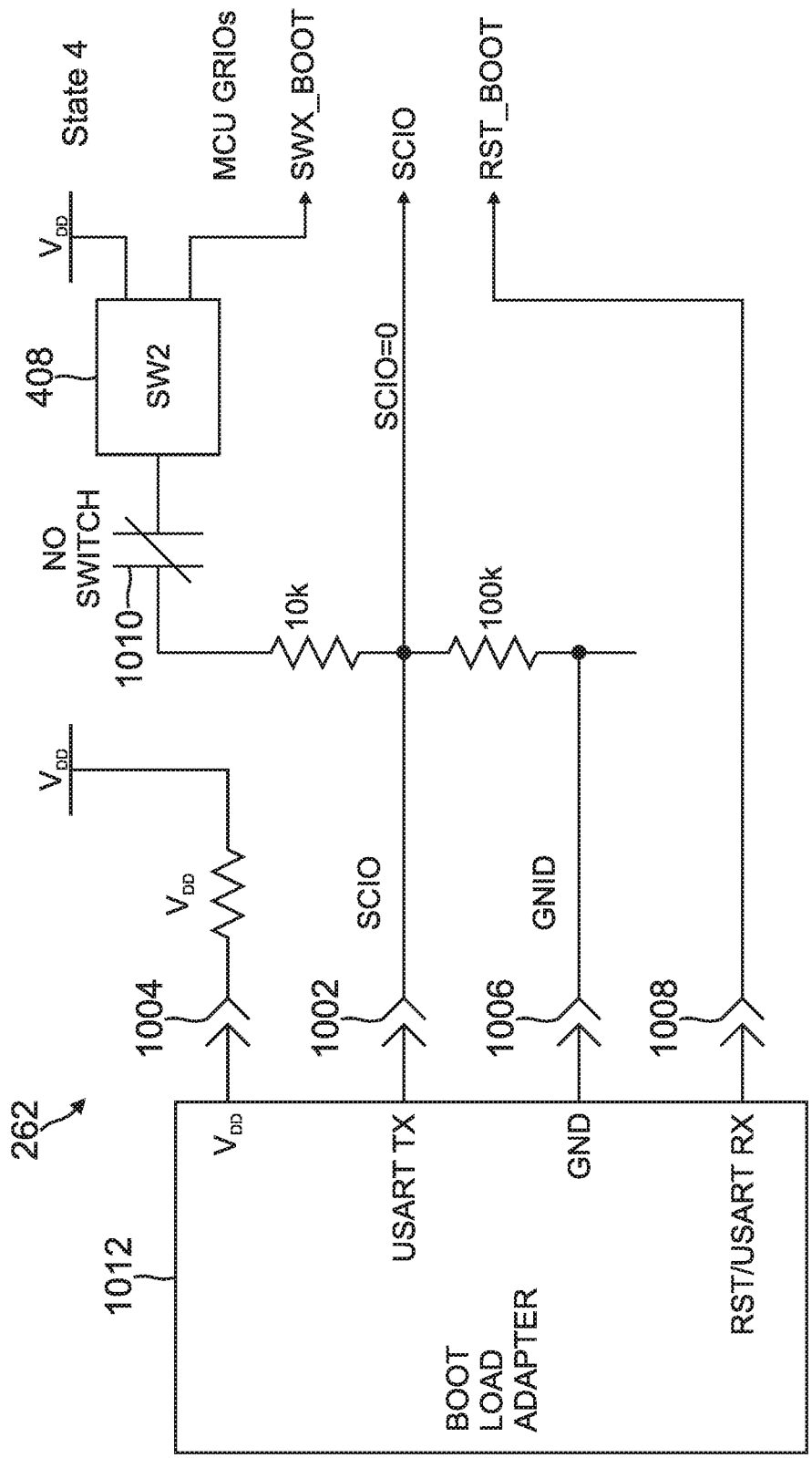

FIG. 10D illustrates the storage-device interface 262 with a diagnostic device 1012 connected to the adapter 260. Similar to when a passive optical connector 118 is connected to the adapter 260, the programmable processor 256 can detect that a connector (in this case the diagnostic device 1012) has been inserted into the adapter 260 and set the second switch 408 to the first state such that VDD is no longer coupled to the input/output line. The diagnostic device 1012 can then send a reset signal to the programmable processor 256 over the reset line as discussed above with respect to FIG. 4. The programmable processor 256 can then reset and enter boot loader mode. The diagnostic device 1012 and the programmable processor 256 can then communicate using the USART transmitting and receive lines as discussed above with respect to FIG. 4. Once the communications between the diagnostic device 1012 and the programmable processor 256 have completed, the diagnostic device 1012 can be disconnected from the adapter and the storage-device interface 262 can return to the state described with respect to FIG. 10A above.

The above described acts of the programmable processor 256 are implemented by instructions (e.g., firmware) stored on a storage device (e.g., storage device 258) coupled to the programmable processor 256. The instructions are configured to be executed by the programmable processor 256 to implement the acts described above. In an example, the instructions implement an embedded real time operation system (RTOS) with preemptive scheduling. The instructions define 4 tasks for the RTOS. These are the AOM task, the storage-device task, the boot loader task, and the idle task.

The AOM task is the main task. The AOM task continuously monitors the inventory interface 402 for messages from the host device 104. The AOM task also emulates a storage device as described above by maintaining the virtual INF-8074i table in the storage device 258 (e.g., RAM) of the programmable processor 256. The AOM task response to two addresses from the host device 104. One address is for the host connection to the AOM transceiver 222, the other address is for the host connection to the emulated storage device. The AOM task also configures and periodically retrieves data from the transceiver 222, monitors for insertion and removal of passive optical connectors 118 to the adapter 260 from the storage device task, and toggles the first switch 406. When a new passive optical connector 118 is inserted into the adapter 260, the AOM task obtains PLM information from storage device task and stores PLM information in the virtual table of the storage device 258. The AOM task also reads information for user/host writable area and interprets as commands/messages.

The storage device task is the highest priority task and is normally inactive until a cable insertion or removal event occurs. When such a cable event occurs, the storage device task reads the PLM information from a storage device 132 if associated with the passive optical connector 118, notifies the AOM task, and returns to inactive. The boot loader task also gives visual indications of the boot loading process via the LEDs, for example, software download failed. The boot loader task only runs on startup and on external reset of the programmable processor 256 when other tasks are inactive. The idle task runs when no other task is running.

Figure 5:
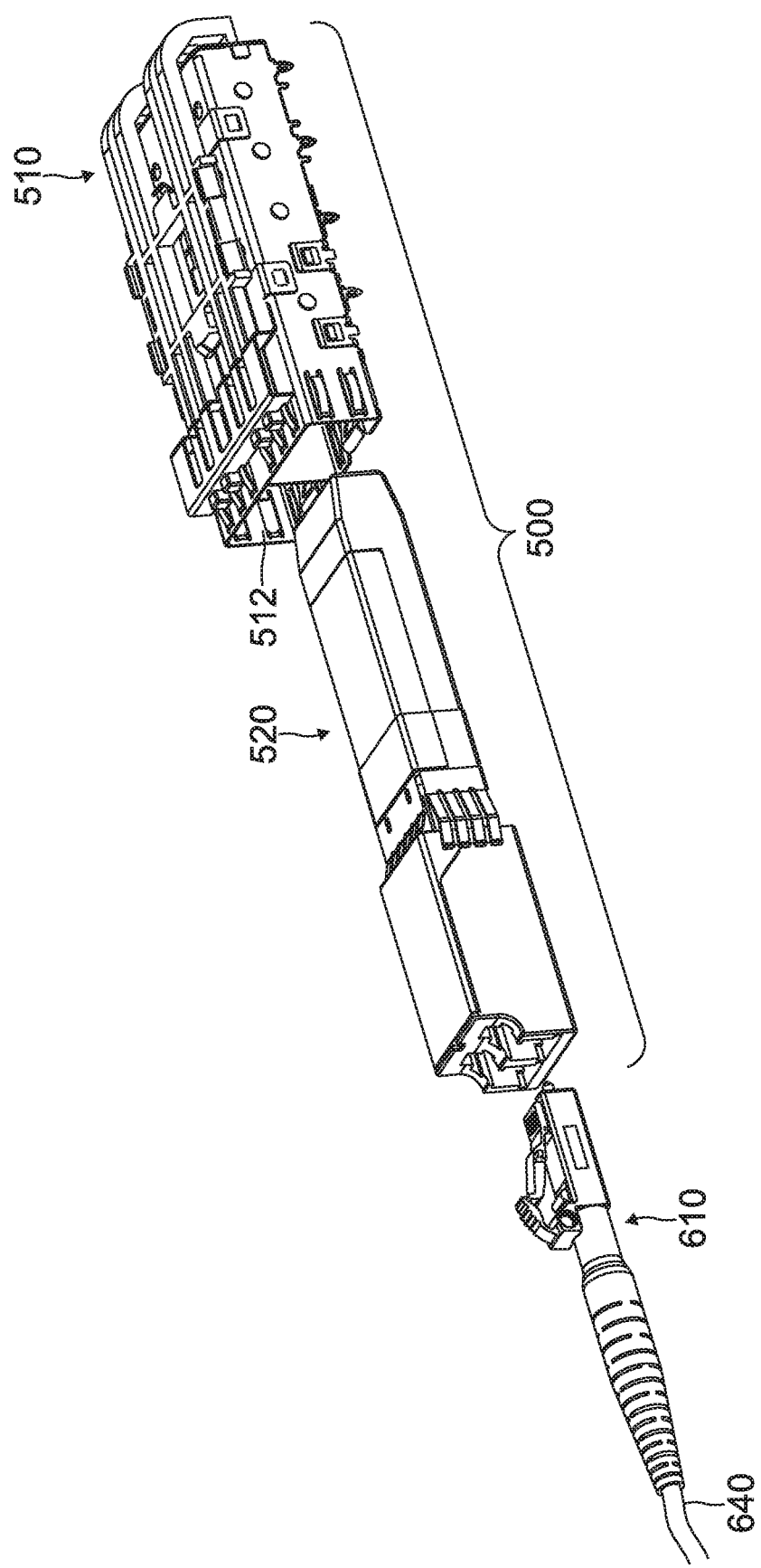
FIG. 5 is a perspective view of an example switching system including a host device, at least one pluggable active optical module, and at least one optical connector.

FIG. 5 illustrates an example switching system 500 including a host device 510 (e.g., host switch, host router, etc.), at least one pluggable active optical module 520, and at least one optical connector 610. The host device 510 defines ports at which electrical signals are received and transmitted from and to a network. The host switch 510 also defines one or more ports 512 (e.g., to card cages) through which pluggable transceiver modules 520 are received at the host device 510. One or more optical connectors 610 can be received at each transceiver module 520. Typically, each transceiver module 520 is configured to receive two optical connectors 610. Each optical connector 610 terminates an optical fiber 640.

In the example shown, the pluggable active optical module 520 is a Small Form-factor Pluggable (SFP/SFP+) module. For example, the pluggable active optical module 520 meets the outside dimensional requirements for a Small Form-factor Pluggable Transceiver as defined in MSA SFF-8432 [5] or MSA INF-8074i [4]. Each transceiver module 520 includes a housing enclosing a transceiver arrangement and a main circuit board 530. The transceiver arrangement is configured to convert between optical signals and electrical signals. The optical signals are carried by the optical fibers 640 via the optical connectors 610; and the electrical signals are carried by electrical conductors via the host device 510. The main circuit board 530 defines a connection (e.g., an edge connection) configured to connect with circuitry within the host device 510. In some implementations, an EEPROM or other storage device is coupled to the main circuit board 530.

In some implementations, the transceiver housing includes a latch arrangement that mates with a latch arrangement of the host device 510 to releasably secure the transceiver module 520 to the host device 510. In some implementations, the transceiver housing includes a first piece (e.g., a base) 521 and a second piece (e.g., a cover) 532 that cooperate to define an interior 522. In some implementations, the pieces 521, 532 are die cast and will therefore act as a passive heat exchanger for the transceiver arrangement. In some implementations, the housing pieces 521, 532 facilitate a top down assembly process in which all components are assembled in the first housing piece 521 through an open top of the first housing piece 521. The second housing piece 532 installs over the open top of the first housing piece 521.

The housing extends from a first end 523 to a second end 524. Ports 527 are defined at the first end 523 for receiving optical connectors 610. One or more ports are defined at the second end for connection to the host device 510. The transceiver arrangement is disposed within a first portion 525 of the housing located towards the first end 523. For example, the transceiver arrangement can include a receiver that aligns with a first port 527 and a transmitter that aligns with a second port 527. The main circuit board 530 is disposed within a second portion 526 of the housing located towards the second end 524.

In some implementations, the transceiver arrangement includes a Receiver Optical Subassembly (ROSA) 528 and a Transmitter Optical Subassembly (TOSA) 529. The ROSA 528 includes a detector diode to detect optical signals and a transimpedance amplifier to convert changes in the diode current into voltage. The TOSA 529 includes a source laser to generate optical signals. In certain implementations, the ROSA 528 and TOSA 529 include sleeves to align connector ferrules 612 (FIG. 8) with the diode and laser, respectively. In other implementations, the transceiver arrangement can include a Bidirectional Optical Subassembly (BOSA) for converting between optical and electrical signals. The BOSA houses a laser source, detector diode, and a wave division multiplexing filter.

A retainer 536 is mounted over the transceiver arrangement within the housing. The retainer 536 defines cutout regions 537 to accommodate the ROSA 528 and TOSA 529. In certain implementations, the retainer 536 also defines a slot 538 that will be described in more detail herein. The cover 532 includes a first portion 533 that extends along the first portion 525 of the housing and a second portion 534 that extends along the second portion 526 of the housing. The first cover portion 533 extends over the transceiver arrangement and the second cover portion 534 extends over the main circuit board 530.

Figure 6:
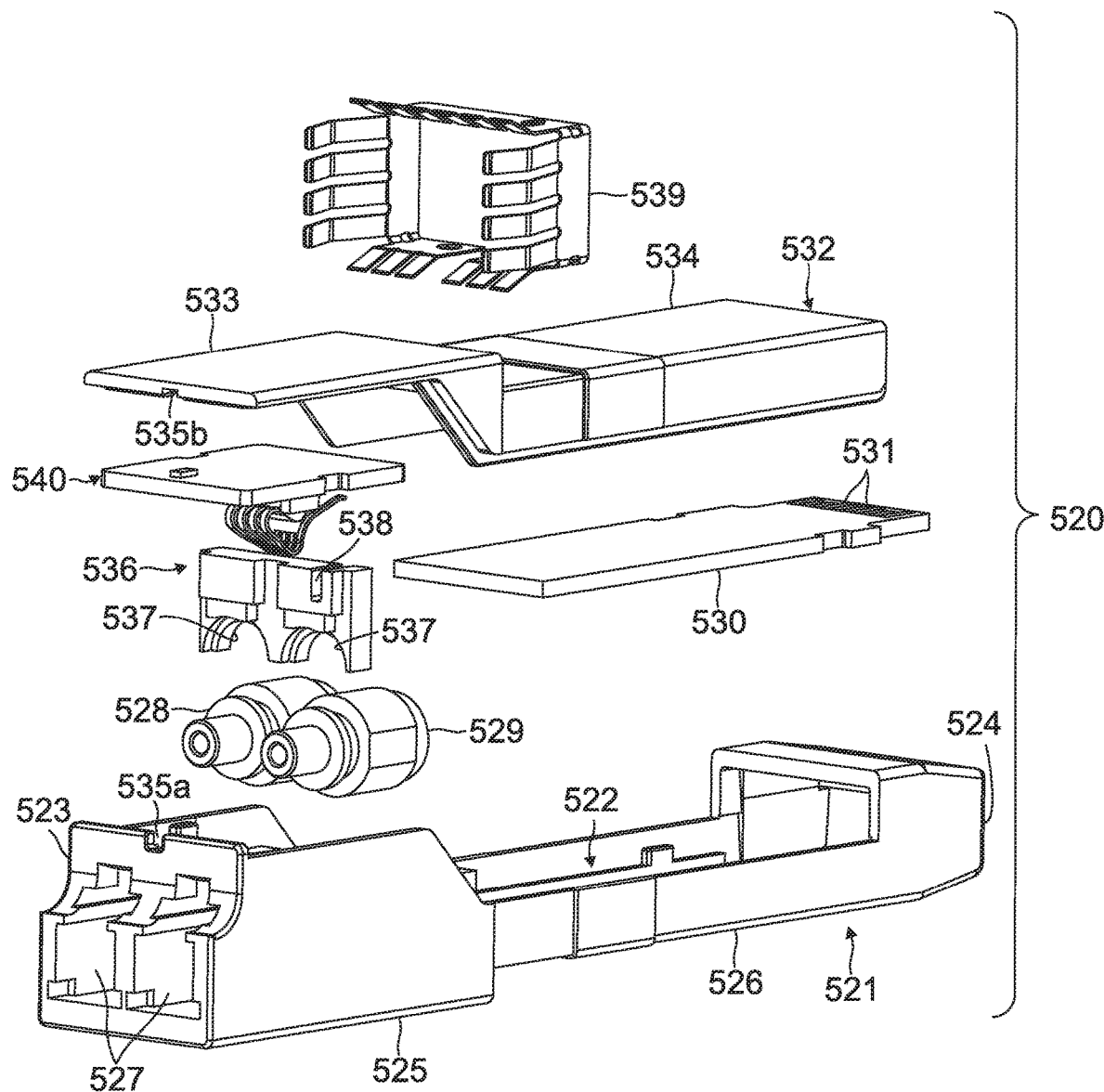
FIG. 6 is an exploded view of an example active optical module for use in the system of FIG. 1.

An Electro-magnetic Interference (EMI) shield 539 is disposed around the housing. In the example shown in FIG. 6, the shield 539 is disposed around the second portion 526 of the housing. In certain implementations, the shield 539 includes a skirt with EMI spring members. In certain implementations, the shield 539 is located at a latching area for the transceiver module 520 at the host device 510.

Figure 7:
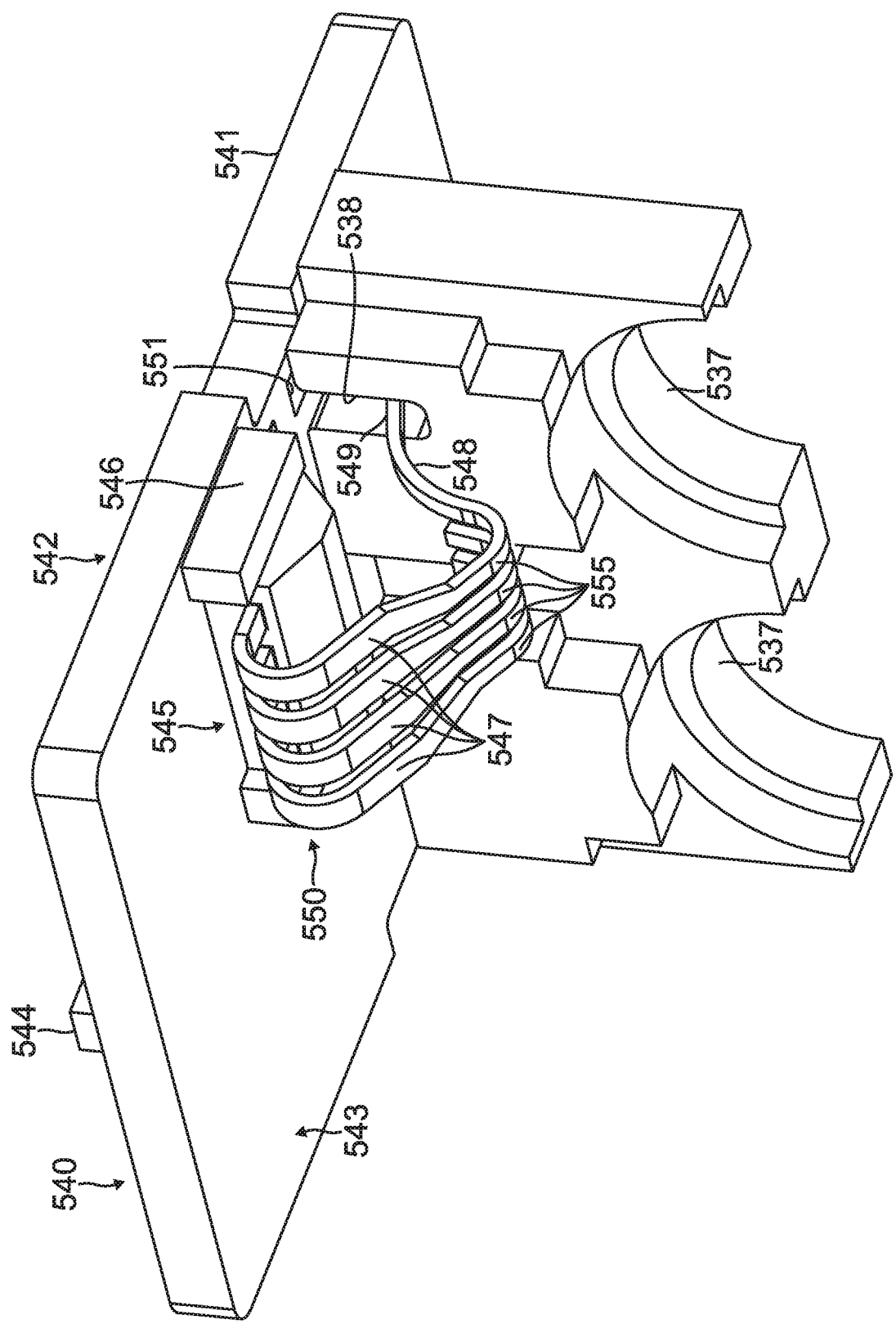
FIG. 7 is a perspective view of example management circuitry including a management circuit board and a storage device interface for an active optical module.

In accordance with some aspects of the disclosure, management circuitry 540 also is disposed within the interior 522 of the transceiver housing. FIG. 7 illustrates one example of suitable management circuitry 540 including a management circuit board 541 and a storage device interface 545 attached thereto. The management circuit board 541 defines a first surface 542 facing towards the second housing piece 532 and a second surface 543 facing towards the transceiver arrangement. The second surface 543 of the management circuit board 541 seats on the retainer 536. In certain implementations, the management circuit board 541 extends across at least part of the first housing portion 525.

The storage device interface 545 is disposed on the second surface 543 of the management circuit board 541. The storage device interface 545 aligns with one of the transceiver module ports 527. In certain implementations, the management circuitry 540 includes multiple storage device interfaces 545, each aligned with one of the ports 527. For example, the management circuitry 540 can include a first storage device interface 545 disposed at the port 527 aligned with the ROSA 528 and a second storage device interface 545 disposed at the port 527 aligned with the TOSA 529.

The storage device interface 545 includes a contact arrangement 550 coupled to a base 546, which couples to the management board 541. The contact arrangement 550 includes one or more contact members 547 extending between first and second ends. The first ends touch contact pads on the management circuit board 541. The contact members 547 extend away from the management circuit board so that the second ends are spaced from the base 546. In certain implementations, the contact members 547 curve back towards the management circuit board 541 to define contact surfaces 555.

Figure 8:
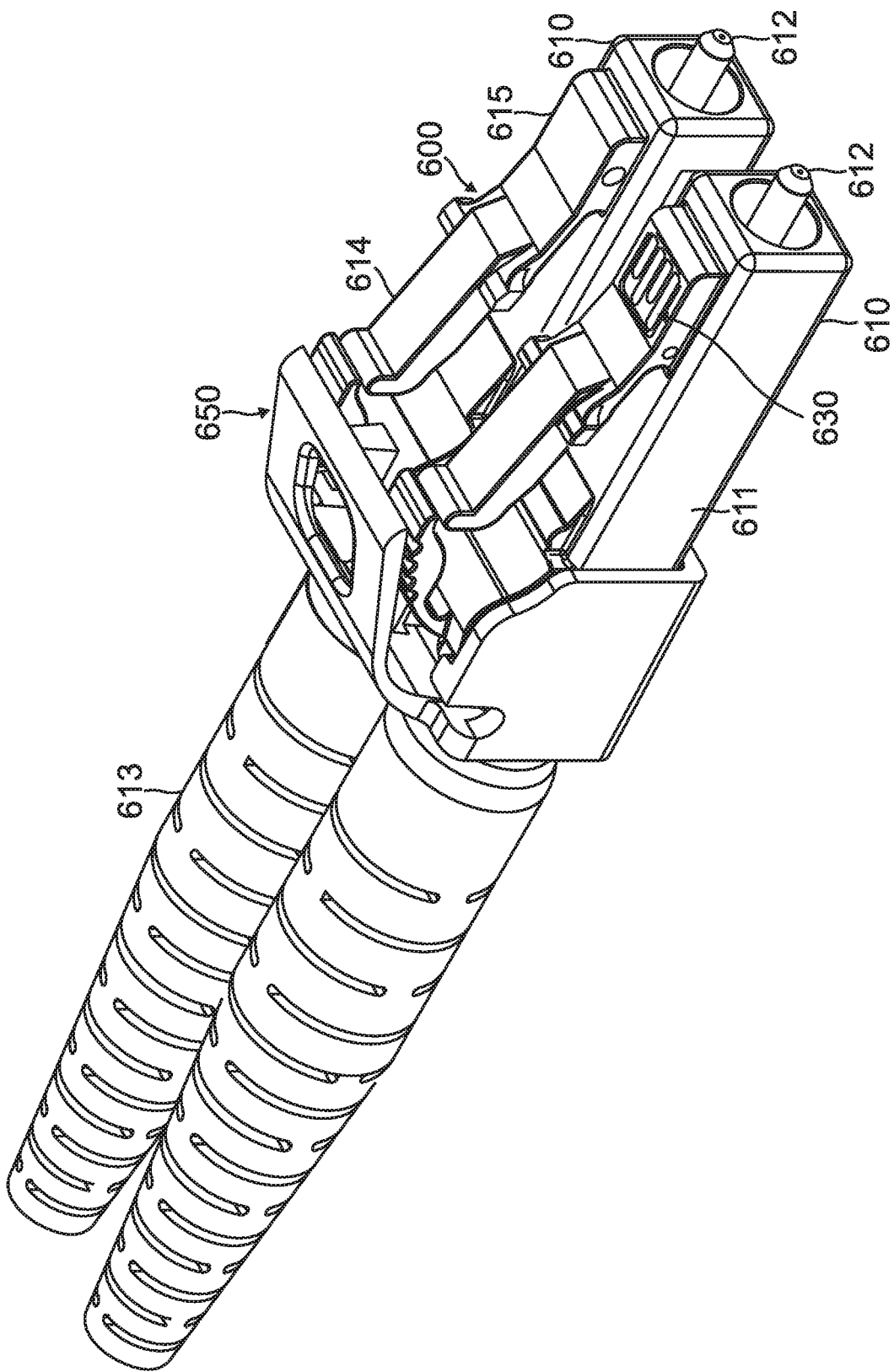
FIG. 8 is a perspective view of an example connector arrangement that is configured to be received at an active optical module.

FIG. 8 illustrates one example connector arrangement 600 that is configured to be received at the transceiver module 520. The connector arrangement 600 includes two optical connectors 610 that are coupled together with a clip 650. Plugging the connector arrangement 600 into the ports 527 of the transceiver module 520 causes a first of the optical connectors 610 to align with the ROSA 528 and a second of the optical connectors 610 to align with the TOSA 529. Accordingly, the duplex connector arrangement 600 carries receive and transmit signals to the transceiver module 520. In other implementations, separate (i.e., non-joined) optical connectors 610 can be plugged into the ports 527.

Each optical connector 610 terminates an optical fiber 640 configured to carry optical signals to and/or from the transceiver arrangement. In some implementations, each optical connector 610 includes a connector body 611 holding a ferrule 612 holding a distal tip of the optical fiber 640. In other implementations, the optical connector 610 can be a ferrule-less connector. The optical connector 610 is configured to releasably attach to the port 527. For example, the optical connector 610 may have a latch arm 614. In other implementations, the connector 610 may have other structure (e.g., latch openings, etc.). In the example shown, the optical connector 610 is an LC connector. In other implementations, the optical connector 610 can be an SC connector, an LX.5 connector, an ST connector, and FC connector, etc.

In accordance with some aspects of the disclosure, at least one of the optical connectors 610 includes a storage device 630 on which information (e.g., physical layer information pertaining to the connector 610 and/or fiber 640) can be stored. In some implementations, the storage device 630 includes an EEPROM or other memory storage chip. In certain implementations, the storage device 630 also includes a circuit board having contact pads 635 connected to the memory (e.g., to the EEPROM). In the example shown, the storage device 630 is disposed at a keying member 615 of the optical connector 610. In other implementations, the storage device 630 can be disposed elsewhere on the optical connector 610.

As shown in FIG. 9, the contact pads 635 of the storage device 630 align with the contact members 547 of the storage device interface 545 when an optical connector 610 is inserted into one of the transceiver module ports 527. The contact surfaces 555 of the contact members 547 slide over/swipe against the contact pads 635 of the storage device 630 when the connector 610 is plugged into the transceiver module 520. Physical contact between the contact pads 635 and the contact members 547 establishes a connection between the memory of the storage device 630 and the management board 541.

In certain implementations, the contact arrangement 550 includes the same number of contact members 547 as the optical connector storage device 630 includes contact pads 635. In the example shown, the contact arrangement 550 includes four contact members 547 and the storage device 630 includes four contact pads 635. In other implementations, the contact arrangement 550 and/or storage device 630 can include a greater or lesser number of contact members 547 and pads 635.

The transceiver module 520 can include a module processor that contacts the optical connector memory and reads/writes to the memory. In certain implementations, the module processor can be mounted to the main circuit board 530. In certain implementations, the module processor can be mounted to the management circuit board 541. In still other implementations, the module processor can be otherwise disposed within the housing. The management circuit board 541 is electrically connected to the module processor. In some implementations, the management circuit board 541 is connected to the main circuit board 530. For example, a flexible cable can extend between the management board 541 and main circuit board 530. In another example, the main board 530 and management board 541 can be formed from a rigid flex circuit board.

In some implementations, the contact arrangement 550 can include a presence sensing member 548 (normally open switch 1010) that is used to determine whether an optical connector 610 has been received at the port 527. For example, the presence sensing member 548 can be configured to touch/swipe a contact pad 551 (FIG. 7) on the second surface 543 of the management board 541 when an optical connector 610 is inserted at a port 527. In the example shown, the presence sensing member 548 includes an extension on one of the contact members 547. The contact member 547 flexes so that a contact surface 549 at the distal end of the extension 548 travels towards and away from the contact pad 551 when the contact surface 555 of the contact member 547 rides over a contact pad 635 of the connector storage device 630. Touching the extension contact surface 549 to the contact pad 551 completes (or shorts) a circuit that indicates the presence of a connector 610.

As shown in FIG. 7, at least part of the contact member 547 having the extension 548 rides within a slot 538 defined in the retainer 536. The slot 538 limits the lateral travel of the distal tip 549 to increase reliability of the distal tip 549 touching the contact pad 551. In some implementations, the distal tip 549 travels within the slot 538. In other implementations, the extension 548 travels within the slot 538 with the distal tip 549 protruding through the slot 538.

An indicator 544 (e.g., an LED) is mounted to and controlled by the management circuit board 541 (see FIG. 7). The indicator 544 can be used to identify the port to a user, to identify a status of the port, and/or to identify whether a correct type of optical connector 610 (e.g., mode consistency, security clearance) or whether a specific connector 610 (e.g., having the correct unique identifier) has been received at the port 527. In an example, the indicator 544 includes a mono-colored LED. In another example, the indicator 544 includes a bi-colored LED. In another example, the indicator 544 includes a tri-colored LED. In other implementations, other types of indicators 544 (e.g., audible indicators) can be utilized.

In the example shown, the indicator 544 is disposed on the first surface 542 of the management board 541. The indicator 544 is visible through an opening 535 (FIG. 9) defined at the first end 523 of the housing. In the example shown in FIG. 6, the opening 535 is defined by a notch 535a in the base 521 at the first end 523 and a notch 535b defined in the first portion 533 of the cover 532. In other implementations, either housing piece 521, 532 can fully define the opening.

Further details, embodiments, and implementations can be found in the following United States patent applications, all of which are hereby incorporated herein by reference:

U.S. Provisional Patent Application Ser. No. 61/152,624, filed on Feb. 13, 2009, titled "MANAGED CONNECTIVITY SYSTEMS AND METHODS" (also referred to here as the "'624 Application"); U.S. patent application Ser. No. 12/705,497, filed on Feb. 12, 2010, titled "AGGREGATION OF PHYSICAL LAYER INFORMATION RELATED TO A NETWORK" (is also referred to here as the '497 Application); U.S. patent application Ser. No. 12/705,501, filed on Feb. 12, 2010, titled "INTER-NETWORKING DEVICES FOR USE WITH PHYSICAL LAYER INFORMATION" (also referred to here as the '501 Application); U.S. patent application Ser. No. 12/705,506, filed on Feb. 12, 2010, titled "NETWORK MANAGEMENT SYSTEMS FOR USE WITH PHYSICAL LAYER INFORMATION" (also referred to here as the '506 Application); U.S. patent application Ser. No. 12/705,514, filed on Feb. 12, 2010, titled "MANAGED CONNECTIVITY DEVICES, SYSTEMS, AND METHODS" (also referred to here as the '514 Application); U.S. Provisional Patent Application Ser. No. 61/252,395, filed on Oct. 16, 2009, titled "MANAGED CONNECTIVITY IN ELECTRICAL SYSTEMS AND METHODS THEREOF" (also referred to here as the "'395 Application"); U.S. Provisional Patent Application Ser. No. 61/253,208, filed on Oct. 20, 2009, titled "ELECTRICAL PLUG FOR MANAGED CONNECTIVITY SYSTEMS" (also referred to here as the "'208 Application"); U.S. Provisional Patent Application Ser. No. 61/252,964, filed on Oct. 19, 2009, titled "ELECTRICAL PLUG FOR MANAGED CONNECTIVITY SYSTEMS" (also referred to here as the "'964 Application"); U.S. Provisional Patent Application Ser. No. 61/252,386, filed on Oct. 16, 2009, titled "MANAGED CONNECTIVITY IN FIBER OPTIC SYSTEMS AND METHODS THEREOF" (also referred to here as the "'386 Application"); U.S. Provisional Patent Application Ser. No. 61/303,961, filed on Feb. 12, 2010, titled "FIBER PLUGS AND ADAPTERS FOR MANAGED CONNECTIVITY" (the "'961 Application"); and U.S. Provisional Patent Application Ser. No. 61/303,948, filed on Feb. 12, 2010, titled "BLADED COMMUNICATIONS SYSTEM" (the "'948 Application"); U.S. Provisional Patent Application Ser. No. 61/252,964, filed on Oct. 19, 2009, titled "ELECTRICAL PLUG FOR MANAGED CONNECTIVITY"; U.S. Provisional Patent Application Ser. No. 61/253,208, filed on Oct. 20, 2009, titled "ELECTRICAL PLUG FOR MANAGED CONNECTIVITY"; U.S. patent application Ser. No. 12/907,724, filed on Oct. 19, 2010, titled "MANAGED ELECTRICAL CONNECTIVITY SYSTEMS"; U.S. Provisional Patent Application Ser. No. 61/303,948, filed on Feb. 12, 2010, titled "PANEL INCLUDING BLADE FEATURE FOR MANAGED CONNECTIVITY"; U.S. Provisional Patent Application Ser. No. 61/413,844, filed on Nov. 15, 2010, titled "COMMUNICATIONS BLADED PANEL SYSTEMS"; U.S. Provisional Patent Application Ser. No. 61/439,693, filed on Feb. 4, 2011, titled "COMMUNICATIONS BLADED PANEL SYSTEMS"; U.S. patent application Ser. No. 13/025,730, filed on Feb. 11, 2011, titled "COMMUNICATIONS BLADED PANEL SYSTEMS"; U.S. patent application Ser. No. 13/025,737, filed on Feb. 11, 2011, titled "COMMUNICATIONS BLADED PANEL SYSTEMS"; U.S. patent application Ser. No. 13/025,743, filed on Feb. 11, 2011, titled "COMMUNICATIONS BLADED PANEL SYSTEMS"; U.S. patent application Ser. No. 13/025,750, filed on Feb. 11, 2011, titled "COMMUNICATIONS BLADED PANEL SYSTEMS"; U.S. Provisional Patent Application Ser. No. 61/303,961; filed on Feb. 12, 2010, titled "Fiber Plug And Adapter For Managed Connectivity"; U.S. Provisional Patent Application Ser. No. 61/413,828, filed on Nov. 15, 2010, titled "Fiber Plugs And Adapters For Managed Connectivity"; U.S. Provisional Patent Application Ser. No. 61/437,504, filed on Jan. 28, 2011, titled "Fiber Plugs And Adapters For Managed Connectivity"; U.S. patent application Ser. No. 13/025,784, filed on Feb. 11, 2011, titled "Managed Fiber Connectivity Systems"; U.S. patent application Ser. No. 13/025,788, filed on Feb. 11, 2011, titled "Managed Fiber Connectivity Systems"; U.S. patent application Ser. No. 13/025,797, filed on Feb. 11, 2011, titled "Managed Fiber Connectivity Systems"; U.S. patent application Ser. No. 13/025,841, filed on Feb. 11, 2011, titled "Managed Fiber Connectivity Systems"; U.S. Provisional Patent Application Ser. No. 61/413,856, filed on Nov. 15, 2010, titled "CABLE MANAGEMENT IN RACK SYSTEMS"; U.S. Provisional Patent Application Ser. No. 61/466,696, filed on Mar. 23, 2011, titled "CABLE MANAGEMENT IN RACK SYSTEMS"; U.S. Provisional Patent Application Ser. No. 61/252,395, filed on Oct. 16, 2009, titled "MANAGED CONNECTIVITY IN ELECTRICAL SYSTEMS"; U.S. patent application Ser. No. 12/905,689, filed on Oct. 15, 2010, titled "MANAGED CONNECTIVITY IN ELECTRICAL SYSTEMS"; U.S. Provisional Patent Application Ser. No. 61/252,386, filed on Oct. 16, 2009, titled "MANAGED CONNECTIVITY IN FIBER OPTIC SYSTEMS"; U.S. patent application Ser. No. 12/905,658, filed on Oct. 15, 2010, titled "MANAGED CONNECTIVITY IN FIBER OPTIC SYSTEMS"; U.S. Provisional Patent Application Ser. No. 61/467,715, filed on Mar. 25, 2011, titled "DOUBLE-BUFFER INSERTION COUNT STORED IN A DEVICE ATTACHED TO A PHYSICAL LAYER MEDIUM"; U.S. Provisional Patent Application Ser. No. 61/467,725, filed on Mar. 25, 2011, titled "DYNAMICALLY DETECTING A DEFECTIVE CONNECTOR AT A PORT"; U.S. Provisional Patent Application Ser. No. 61/467,729, filed on Mar. 25, 2011, titled "IDENTIFIER ENCODING SCHEME FOR USE WITH MULTI-PATH CONNECTORS"; U.S. Provisional Patent Application Ser. No. 61/467,736, filed on Mar. 25, 2011, titled "SYSTEMS AND METHODS FOR UTILIZING VARIABLE LENGTH DATA FIELD STORAGE SCHEMES ON PHYSICAL COMMUNICATION MEDIA SEGMENTS"; and U.S. Provisional Patent Application Ser. No. 61/467,743, filed on Mar. 25, 2011, titled "EVENT-MONITORING IN A SYSTEM FOR AUTOMATICALLY OBTAINING AND MANAGING PHYSICAL LAYER INFORMATION USING A RELIABLE PACKET-BASED COMMUNICATION PROTOCOL".

Example Embodiments

Example 1 includes a pluggable active optical module comprising: an electrical connector at a first end for communicating electrical signals; one or more optical adapters at a second end for communicating optical signals to/from one or more optical fibers; a storage device interface at the second end, wherein the storage device interface is configured to contact a corresponding storage device interface on the one or more optical fibers; a transmitter optical assembly (TOSA) for converting electrical signals from the electrical connector into optical signals for transmission over the one or more optical fibers; a receiver optical assembly (ROSA) for converting optical signals from the one or more optical fibers to electrical signals for sending from the electrical connector; a controller for controlling the TOSA and ROSA; a programmable processor coupled to the storage device interface and one or more first contacts of the electrical connector, wherein the programmable processor is configured to access a storage device in the one or more optical fibers through the storage device interface and provide physical layer management (PLM) information obtained therefrom to a host device connected to the electrical connector; and a switch coupled between a second contact of the electrical connector and ground, the switch coupled to the programmable processor such that that programmable processor can control the switch to selectively connect a second contact of the electrical connector to ground.

Example 2 includes the pluggable active optical module of Example 1, wherein the switch is configured to couple the second contact to ground in a first state and to provide an open connection for the second contact in second state.

Example 3 includes the pluggable active optical module of any of Examples 1-2, wherein the programmable processor is configured to toggle the switch to decouple the second contact from ground and then recouple the second contact to ground in response to receiving or generating updated PLM information regarding the one or more optical adapters.

Example 4 includes the pluggable active optical module of Example 3, wherein the updated PLM information includes information regarding at least one of an insertion of a managed cable, an insertion of an unmanaged cable, a removal of a managed cable, and a removal of an unmanaged cable.

Example 5 includes the pluggable active optical module of Example 3, wherein the updated PLM information includes PLM information read from a storage device coupled to the storage device interface.

Example 6 includes the pluggable active optical module of Example 3, wherein the updated PLM information includes information indicating that one or more optical connectors connected to the one or more optical adapters do not have associated therewith, a storage device for coupling with the storage device interface.

Example 7 includes the pluggable active optical module of any of Examples 3-6, wherein the programmable processor is configured to obtain or generate updated PLM information in response to detecting insertion of an optical connector into the one or more optical adapters.

Example 8 includes the pluggable active optical module of any of Examples 3, 5, or 7, wherein the updated PLM information includes a cable identifier for a cable having one or more optical connectors connected to the one or more optical adapters, wherein the storage device is associated with at least one of the one or more optical connectors.

Example 9 includes the pluggable active optical module of any of Examples 3, 5, or 7-8, wherein the updated PLM information includes a cable end identifier, identifying which end of a cable is connected to the one or more optical adapters.

Example 10 includes the pluggable active optical module of Example 3, wherein the updated PLM information includes at least one of information indicating an invalid cable or information indicating no cable connected.

Example 11 includes a system comprising: a host device having a first port with a first electrical connector; a pluggable active optical module connected to the first port of the host device, the pluggable active optical module including: a second electrical connector at a first end for communicating electrical signals, the second electrical connector connected to the first electrical connector of the host device; one or more optical adapters at a second end for communicating optical signals; a first storage device interface at the second end; a programmable processor coupled to the first storage device interface and to one or more first contacts of the second electrical connector; and a switch coupled between a second contact of the second electrical connector and ground, the switch coupled to the programmable processor such that the programmable processor can control the switch to selectively connect a second contact of the electrical connector to ground, wherein the host device is configured to determine whether a pluggable active optical module is connected to the first port based on voltage state of a third contact on the first electrical connector contacting the second contact; a fiber optic cable having a first passive optical connector on a first end, the first passive optical connector having a first storage device and a second storage device interface associated therewith, wherein the first passive optical connector is connected to the one or more optical adapters of the pluggable active optical module and the second storage device interface contacts the first storage device interface; and an aggregation point communicatively coupled to the host device; wherein the programmable processor is configured to access the first storage device in the fiber optic cable through the first storage device interface and provide physical layer management (PLM) information obtained therefrom to the host device over the one or more first contacts; wherein the host device is configured to send a read message to the pluggable active optical module over the one or more first contacts to obtain AOM information therefrom; wherein the programmable processor of the pluggable active optical module is configured to include the PLM information obtained from the first storage device along with the AOM information in a return message over the one or more first contacts in response to the read message from the host device; wherein the host device is configured to provide the PLM information to the aggregation point.

Example 12 includes the system of Example 11, wherein the switch is configured to couple the second contact to ground in a first state and to provide an open connection for the second contact in a second state; wherein the host device is configured to determine that a pluggable active optical module is connected to a first port when the third contact is at ground voltage and to determine that a pluggable active optical module is not connected to the first port when the third contact has an open connection.

Example 13 includes the system of any of Examples 11-12, wherein the programmable processor is configured to toggle the switch to decouple the second contact from ground and then recouple the second contact to ground in response to receiving or generating updated PLM information regarding the one or more optical adapters; wherein the host device is configured to send the read message to the pluggable active optical module to obtain AOM information in response to decoupling the third contact from ground and then recoupling the third contact to ground; wherein the programmable processor of the pluggable active optical module is configured to include the updated PLM information along with the AOM information in the return message in response to the read message from the host device.

Example 14 includes the system of Example 13, wherein the updated PLM information includes information regarding at least one of an insertion of a managed cable, an insertion of an unmanaged cable, a removal of a managed cable, and a removal of an unmanaged cable.

Example 15 includes the system of any of Examples 13-14, wherein the programmable processor is configured to obtain or generate the updated PLM information in response to detecting insertion of an optical connector into the one or more optical adapters.

Example 16 includes the system of any of Examples 13 or 15, wherein the updated PLM information includes a cable identifier for the fiber optic cable, a cable rating, a cable category, a cable length, a cable color, a manufacturer date, a manufacturer place, a port insertion count, a cable end insertion count.

Example 17 includes the system of any of Examples 13 or 15-16, wherein the updated PLM information includes a cable end identifier, identifying the first end of the fiber optic cable from a second end of the first optical cable.

Example 18 includes the system of Example 13, wherein the updated PLM information includes at least one of information indicating an invalid cable or a universal code indicating no cable/connector connected.

Example 19 includes the system of any of Examples 11-18, wherein the host device is configured to store the AOM information and the PLM information in a MIB block at the host device; wherein the aggregation point is configured to obtain the PLM information in the MIB by issuing a SNMP request to the host device.

Example 20 includes the system of any of Examples 11-19, wherein the PLM information is inserted into a portion of the read message that is not used for the AOM information.

Example 21 includes the system of any of Examples 11-20, wherein the programmable processor is configured to conform to the I$^2$C interface for messages sent to the host device over the one or more contacts.

Example 22 includes the system of any of Examples 11 or 19-21, wherein the AOM information includes an AOM identifier and the PLM information includes a cable identifier.

Example 23 includes a method for simulating insertion of a pluggable active optical module, the method comprising: detecting whether a state of an optical adapter of a pluggable active optical module regarding connection of a fiber optic cable has changed; obtaining/generating PLM information regarding the fiber optic cable in response to detection of change in state of the optical adapter; toggling a voltage state of a module present pin of a host device to which the pluggable active optical module is connected in response to obtaining/generating the PLM information, wherein the host device is configured to determine whether a pluggable active optical module is present based on the voltage state of the module present pin; receiving a read command from the host device in response to toggling the switch; and providing the PLM information to the host device in response to the read command.

Example 24 includes the method of Example 23, wherein obtaining PLM information includes: determining that the first optic cable is unmanaged; and generating the PLM information such that the PLM information indicates that the fiber optic cable is unmanaged.

Example 25 includes the method of Example 23, wherein obtaining PLM information includes reading the PLM information from a storage device coupled to a storage device interface associated with the optical adapter of the pluggable active optical module, wherein the storage device is associated with the fiber optic cable.

Example 26 includes the method of any of Examples 23-25, wherein toggling a voltage state includes decoupling the module present pin from ground and then recoupling the module present pin to ground.

Example 27 includes the method of Example 26, wherein decoupling the module present pin from ground includes providing an open connection for the module present pin.

Example 28 includes the method of any of Examples 23-27, comprising: detecting a toggle in the voltage state of the module present pin at the host device; and sending the read command to the pluggable active optical module in response to detecting the toggle.

Example 29 includes the method of any of Examples 23-28, comprising: storing the PLM information in a MIB block at the host device; issuing a SNMP request for the MIB block, from an aggregation point to the host device; and receiving the PLM information in the MIB block at the aggregation point in response to the SNMP request.

Example 30 includes the method of any of Examples 23-29, wherein receiving a read command and providing the PLM information include communicating in a manner that conforms to the I$^2$C interface.

What is claimed is:

1. A pluggable active optical module having a first end and a second end, the pluggable active optical module comprising:
    an electrical connector at the first end, the electrical connector configured to communicate electrical signals;
    at least one optical adapter at the second end, the at least one optical adapter configured to communicate optical signals over at least one optical fiber;
    a storage device interface at the second end, wherein the storage device interface is configured to contact a corresponding storage device interface on the at least one optical fiber;
    a transmitter optical assembly configured to convert electrical signals received from the electrical connector into optical signals for communication by the at least one optical adapter over the at least one optical fiber;
    a receiver optical assembly for converting optical signals received from the at least one optical adapter to electrical signals for communication by the electrical connector;
    a controller for controlling the transmitter optical assembly and the receiver optical assembly;
    a programmable processor coupled to the storage device interface and at least one first contact of the electrical connector, wherein the programmable processor is configured to:
        access physical layer management information from a storage device in the at least one optical fiber through the storage device interface; and
        provide the physical layer management information obtained from the storage device to a host device connected to the electrical connector; and
    a switch between a second contact of the electrical connector and ground, the switch configured to selectively connect the second contact of the electrical connector to ground.

2. The pluggable active optical module of claim 1, wherein the switch is configured to:
    connect the second contact to ground in a first state; and
    provide an open connection for the second contact in second state.

3. The pluggable active optical module of claim 1, wherein the pluggable active optical module is configured to:
    toggle the switch to decouple the second contact from ground; and recouple the second contact to ground in response to receiving or generating updated physical layer management information regarding the at least one optical adapter.

4. The pluggable active optical module of claim 3, wherein the updated physical layer management information includes information regarding at least one of an insertion of a managed cable, an insertion of an unmanaged cable, a removal of a managed cable, and a removal of an unmanaged cable.

5. The pluggable active optical module of claim 3, wherein the updated physical layer management information includes physical layer management information read from a storage device coupled to the storage device interface.

6. The pluggable active optical module of claim 3, wherein the updated physical layer management information includes information indicating that at least one optical connector connected to the at least one optical adapter is not associated with a storage device for coupling with the storage device interface.

7. The pluggable active optical module of claim 3, wherein the programmable processor is configured to obtain or generate updated physical layer management information in response to detecting insertion of an optical connector into the at least one optical adapter.

8. The pluggable active optical module of claim 3, wherein the updated physical layer management information includes a cable identifier for a cable having at least one optical connector connected to the at least one optical adapter, wherein the storage device is associated with one or more of the at least one optical connector.

9. The pluggable active optical module of claim 3, wherein the updated physical layer management information includes a cable end identifier, identifying which end of a cable is connected to the at least one optical adapter.

10. The pluggable active optical module of claim 3, wherein the updated physical layer management information includes at least one of information indicating an invalid cable or information indicating no cable connected.

11. A system comprising:
a host device having a first port with a first electrical connector;
a pluggable active optical module connected to the first port of the host device, the pluggable active optical module having a first end and a second end, the pluggable active optical module including:
a second electrical connector at the first end, the second electrical connector configured to communicate electrical signals, the second electrical connector configured to connect to the first electrical connector of the host device;
at least one optical adapter at the second end, the at least one optical adapter configured to communicate optical signals;
a first storage device interface at the second end;
a programmable processor communicatively coupled to the first storage device interface and to at least one first contact of the second electrical connector; and
a switch coupled between a second contact of the second electrical connector and ground, the switch configured to selectively connect the second contact of the second electrical connector to ground;
wherein the host device is configured to determine whether the pluggable active optical module is connected to the first port based on a voltage state of a third contact on the first electrical connector contacting the second contact;
a fiber optic cable having a first passive optical connector, the first passive optical connector including:
a storage device; and
a second storage device interface associated with the storage device;
wherein the second storage device interface is configured to contact the first storage device interface when the first passive optical connector is connected to the at least one optical adapter of the pluggable active optical module; and
wherein the programmable processor is configured to:
access physical layer management information from a storage device in the fiber optic cable through the first storage device interface and the second storage device interface;
provide the physical layer management information obtained from the storage device to the host device over the at least one first contact;
wherein the host device is configured to send a read message to the pluggable active optical module over the at least one first contact to obtain active optical module information therefrom; and
wherein the programmable processor of the pluggable active optical module is configured to include the physical layer management information obtained from the storage device along with the active optical module information in a return message over the at least one first contact in response to the read message from the host device.

12. The system of claim 11, wherein the switch is configured to couple the second contact to ground in a first state and to provide an open connection for the second contact in a second state;
wherein the host device is configured to determine that the pluggable active optical module is connected to a first port when the third contact is at ground voltage and to determine that the pluggable active optical module is not connected to the first port when the third contact has an open connection.

13. The system of claim 11, wherein the pluggable active optical module is configured to toggle the switch to decouple the second contact from ground and then recouple the second contact to ground in response to receiving or generating updated physical layer management information regarding the at least one optical adapter;
wherein the host device is configured to send the read message to the pluggable active optical module to obtain active optical module information in response to decoupling the third contact from ground and then recoupling the third contact to ground;
wherein the programmable processor of the pluggable active optical module is configured to include the updated physical layer management information along with the active optical module information in the return message in response to the read message from the host device.

14. The system of claim 13, wherein the updated physical layer management information includes information regarding at least one of an insertion of a managed cable, an insertion of an unmanaged cable, a removal of a managed cable, and a removal of an unmanaged cable.

15. The system of claim 13, wherein the programmable processor is configured to obtain or generate the updated physical layer management information in response to detecting insertion of an optical connector into the at least one optical adapter.

16. The system of claim 13, wherein the updated physical layer management information includes a cable identifier for the fiber optic cable, a cable rating, a cable category, a cable length, a cable color, a manufacturer date, a manufacturer place, a port insertion count, a cable end insertion count.

17. The system of claim 13, wherein the updated physical layer management information includes a cable end identifier, identifying the first end of the fiber optic cable from a second end of the first optical cable.

18. The system of claim 13, wherein the updated physical layer management information includes at least one of information indicating an invalid cable or a universal code indicating no cable/connector connected.

19. The system of claim 11, further comprising:
an aggregation point communicatively coupled to the host device;
wherein the host device is configured to:
provide the physical layer management information to the aggregation point;
store the active optical module information and the physical layer management information in a master information block at the host device;
wherein the aggregation point is configured to obtain the physical layer management information in the master information block by issuing a Simple Network Management Protocol request to the host device.

20. The system of claim 11, wherein the physical layer management information is inserted into a portion of the read message that is not used for the active optical module information.

21. The system of claim 11, wherein the programmable processor is configured to conform to the I$^2$C interface for messages sent to the host device over the one or more contacts.

22. The system of claim 11, wherein the active optical module information includes an active optical module identifier and the physical layer management information includes a cable identifier.

23. A method comprising:
connecting at least one optical fiber to at least one optical adapter of a pluggable active optical module;
receiving downlink electrical signals at an electrical connector in the pluggable active optical module;
converting the downlink electrical signals into downlink optical signals at the pluggable active optical module;
communicating the downlink optical signals from at least one optical adapter of the pluggable active optical module over at least one optical fiber;
receiving uplink optical signals from the at least one optical fiber at the at least one optical adapter of the pluggable active optical module;
converting the uplink optical signals into uplink electrical signals at the pluggable active optical module;
accessing physical layer management information from a storage device in the at least one optical fiber through a storage device interface on the pluggable active optical module;
providing the physical layer management information obtained from the storage device to a host device connected to the electrical connector; and
selectively connecting a contact of the electrical connector to ground.

* * * * *